United States Patent [19]
Frasca

[11] Patent Number: 4,653,446
[45] Date of Patent: Mar. 31, 1987

[54] ROTARY INTERNAL COMBUSTION ENGINE

[76] Inventor: Joseph F. Frasca, 5801 Yorktown Rd., Lorain, Ohio 44053

[21] Appl. No.: 690,888

[22] Filed: Jan. 14, 1985

[51] Int. Cl.⁴ .............................................. F02B 53/00
[52] U.S. Cl. .................... 123/244; 418/231; 418/233
[58] Field of Search ................ 123/244; 418/218, 228, 418/229, 230, 231, 232, 233

[56] References Cited

U.S. PATENT DOCUMENTS

| | | | |
|---|---|---|---|
| 782,359 | 2/1905 | Rathjem et al. | 418/218 |
| 2,436,285 | 2/1948 | Booth | 418/233 X |
| 3,762,844 | 10/1973 | Isaksen | 418/218 |
| 3,769,945 | 11/1973 | Kahre | 418/231 |
| 3,838,954 | 10/1974 | Rapone | 418/218 X |
| 4,137,890 | 2/1979 | Wohl | 418/232 X |

FOREIGN PATENT DOCUMENTS 143132  9/1982  Japan .................................. 123/244

Primary Examiner—Michael Koczo

[57] ABSTRACT

The invention is an internal combustion engine for two or four cycle mechanical power generation. The engine has an annular cavity formed between its rotor and casing and around the rotor rotational axis. The rotor surface at the annular cavity has undulation(s) and the casing surface at the annular cavity has a plurality of circumferentially spaced axial plane slots each with a partition pivotally extending into the annular cavity but not abutting the annular cavity walls and in the combustion region therein and when there is a compression region to very close proximity of the cavity walls. The partitions in the annular cavity form a plurality of circumferential spaced volume varying chambers which cyclically vary in volume with rotor rotation. The partitions are displaced in their slots by a rotor cam means outside the annular cavity with undulations allowing the continued extension of the partitions to the rotor undulant surface in the annular cavity without abutting it. The power out loss due to the allowed mass flow between neighboring volume varying chambers is sustained rather then the large losses that occur if volume varying chambers where closed to one another in the annular cavity and the wear of the parts in the annular cavity. The engine has intake means, exhaust means, and fuel injection means arranged at the annular cavity allowing the volume varying chambers to function in a four cycle or two cycle mechanical power generation process. Ignition means if used in the engine, are used only once per operation to initiate combustion in the annular cavity, thereafter the combustion process in the annular cavity is self perpetuating.

13 Claims, 60 Drawing Figures

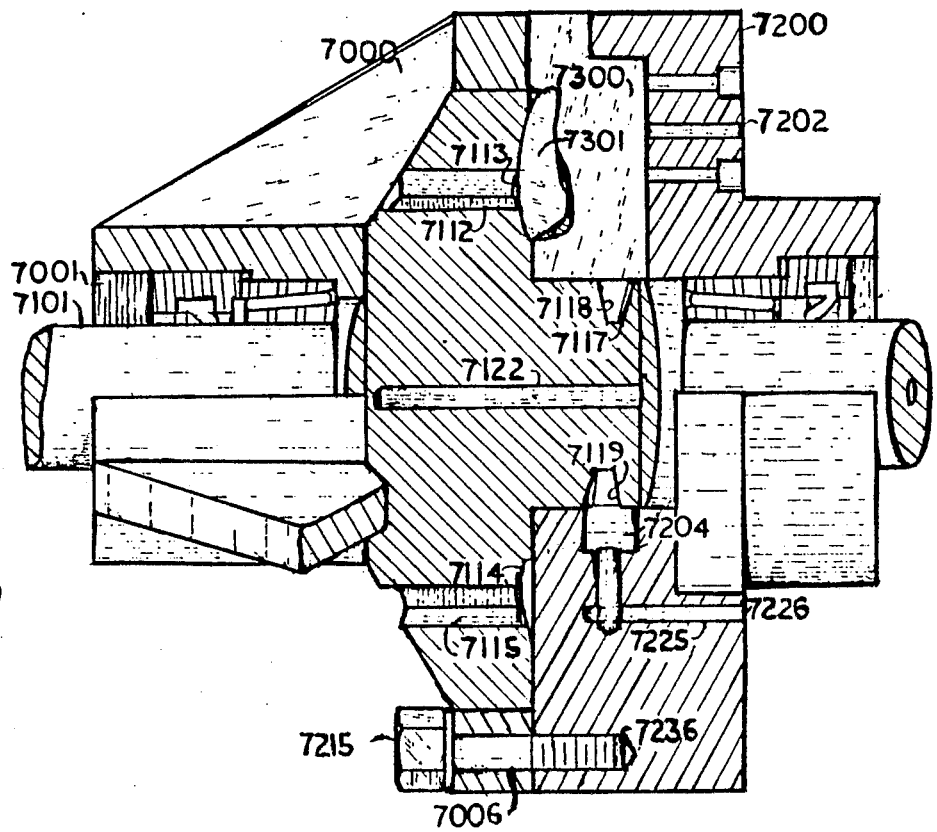
FIG. 35
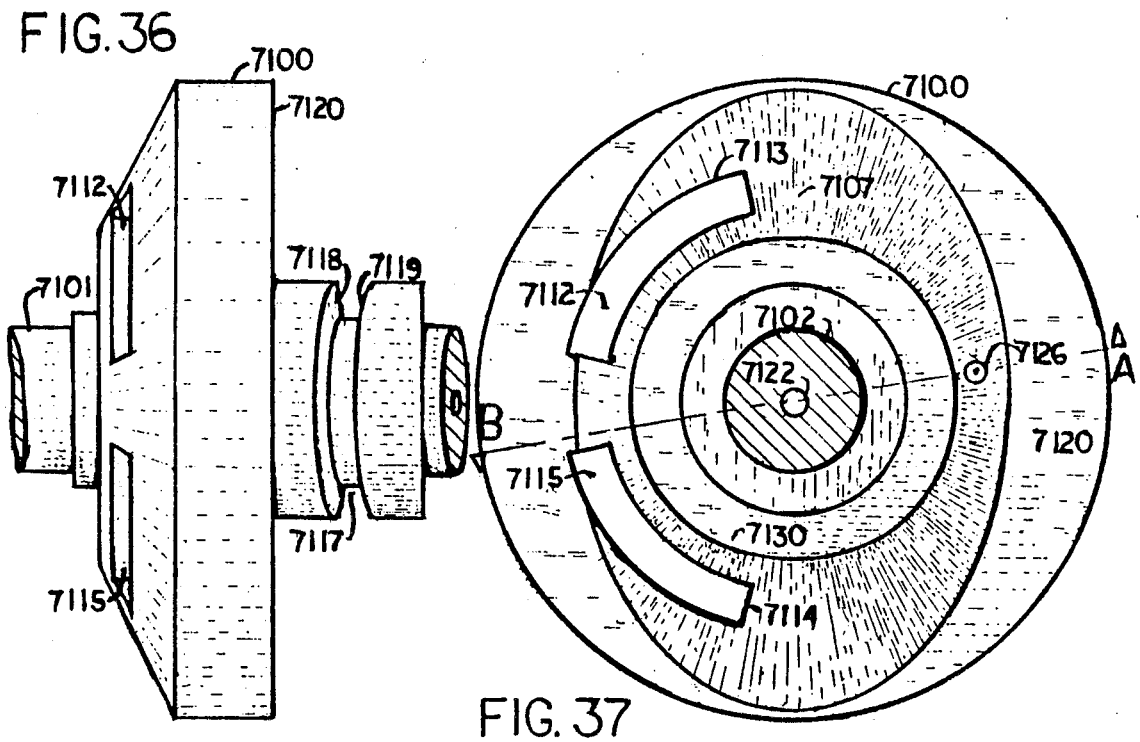
FIG. 36
FIG. 37

ROTARY INTERNAL COMBUSTION ENGINE

BACKGROUND OF THE INVENTION

This engine is comprised of a mechanical combination for utilization as a rotary internal combustion engine, and is based on my abandoned U.S. patent applications:

Ser. No. 031,006; filing date 04/18/79
Ser. No. 056,875; filing date 07/12/79
Ser. No. 107,349; filing date 12/26/79 and the disclosure documents referenced within those applications for patents and the disclosure documents filed while the above applications where still pending and wherein said applications were referenced. Additionally in the field of art are patents:

U.S. Pat. No. 4,089,305 of 05/1978 inventor Gregg,
U.S. Pat. No. 3,896,772 of 07/1978 inventor Lyle,
U.S. Pat. No. 3,894,519 of 07/1975 inventor Moran,
U.S. Pat. No. 782,359 of 02/1905 inventor Rathjen et al,
U.S. Pat. No. 687,514 if 11/1901 inventor Benett.

SUMMARY OF THE INVENTION

My invention is a rotary internal combustion engine having a casing and a rotor. The rotor is mounted for relative rotation to the casing. There is an annular cavity formed between the casing and the rotor about the axis of rotor rotation. The rotor has a wave surface at the annular cavity. The casing has a face surface at the annular cavity across form the rotor wave surface. The rotor wave surface and the casing face surface are boundary surfaces of the annular cavity. The rotor wave surface has at least one pair of circumferential spaced wave like reliefs or undulations when the cycles of mechanical power generation for the plurality of working chambers in the annular cavity, the volume varying chambers, are: intake, compression, injection-ignition-combustion and exhaust, i.e. four cycle. The rotor wave surface has at least one wave like relief or undulation when the cycles of power generation in the volume varying chambers are: high pressure intake-injection-combustion, and exhaust, i.e. two cycle. For four cycle operation there is a compression station in the annular cavity at the first of each pair of undulations of the rotor wave surface, and a combustion station at the second. For two cycle operation the one essential station is the combustion station.

The casing has a plurality of circumferential spaced, axially oriented slots in it, i.e. slots oriented in planes containing the axis of rotor rotation or planes slightly askew or parallel said planes. Each slot opens to the annular cavity at the face surface. A partition element, hereinafter called a "partition", is mounted in each of the casing slots for pivotal, axially directed motion therein i.e. motion in planes containing the rotor rotational axis or slightly displaced parallel or askew such planes. Each partition extends from its slot into the annular cavity and it edge surface in the cavity does not abut the cavity surface towards which it extends. In portions of the annular cavity the partition edge surface is in close proximity to the cavity surface towards which it extends. A plurality of circumferential spaced volume varying chambers are in the annular cavity. A volume varying chamber is formed between consecutive partitions in the cavity. The rotor has a circumferential cam means on it, the rotor cam means, which is outside the annular cavity and coaxial with it. A portion of each partition is operatively engaged by the rotor cam means for the pivotal extension of the partition from its slot into the annular cavity and for said close proximity of surfaces. The engagement is such that with the rotation of the rotor in the casing, each partition, during its rotor effected traverse of the annular cavity, is pivotally displaced in the annular cavity and its edge surface in the annular cavity does not abut the annular cavity surface towards which it extends and is maintained in close proximity to the surface at least in the combustion and compression regions of the annular cavity. There is a cyclic volume variation between minimum and maximum volume in each volume varying chamber with its rotor effected traverse of the annular cavity stations.

In the four cycle engine there is an intake region in the compression station in the annular cavity. The volume varying chambers traversing the intake region increase in volume taking in noncombustible combustion supporting substances, hereinafter called substances, from outside the engine through porting, channeling and apertures in the engine. There is a compression region in each compression station. The volume varying chambers traversing the compression region decrease in volume compressing their contents. There is a combustion region in each combustion station. The volume varying chambers traversing the combustion region of the combustion station increase in volume. It is in the volume varying chambers in the combustion region of the annular cavity combustion station that combustion processes occur which drive the rotor in rotation for mechanical power output. There is an exhaust region in each combustion station of the annular cavity. The volume varying chambers traversing the exhaust region of the combustion station decrease in volume and expel their contents, the products of combustion, from the annular cavity to outside the engine through porting, channeling and apertures of the engine.

The engine of two cycle operation has a combustion station which functions like the combustion station of the four cycle engine. There is a high pressure inlet aperture to the region of the annular cavity after the exhaust region of the combustion station and at the adjacent combustion region, where the volume varying chambers are at a minimum volume. The high pressure inlet aperture is for the inlet of substances under high pressure to the volume varying chambers communicating with it. The high pressure inlet in turn is supplied the substances under high pressure from outside the engine by channeling and porting of the engine.

Both the two and four cycle engine have fuel injection means for supplying combustibles for the combustion processes in the volume varying chambers in the combustion region. Fuel injection means may be located in the casing at each volume varying chamber or at the rotor with at least one injection nozzle per station. In the two cycle engine the rotor injector is located in the same region as the high pressure inlet aperture and in a manner minimizing the high pressure mass back flow from the combustion processes in the combustion region to the high pressure aperture. In the four cycle engine the rotor injector means is located in the combustion region of the combustion station near its juncture with the compression region of the compression station. In both the two and four cycle engines the injector in the rotor supplies each volume varying chamber of the annular cavity with combustibles in their traverse across it. The fluid pressure for the injector means in the rotor may be supplied by the rotor rotation.

Ignition means are not absolutely essential in the engine as auto-ignition may be used to initiate combustion. Flame spread to each newly fuel injected volume varying chamber from its combustion involved preceding neighbor in the combustion region through the gap between the edge surface of their common partition and the annular cavity surface towards which it extends ignites the contents of the volume varying chambers entering the combustion region. Thus, combustion processes once initiated in the combustion region are perpetuated. Where auto ignition is not utilized the ignition means need only be very basic because of the self perpetuating characteristics of the combustion process in the engine.

In my invention the internal wear and internal work losses which would result if the volume varying chambers in the combustion and compression regions were closed to one another are greatly reduced. They are replaced by the loss of power output resultant the decrease in operating pressure, particularly in the combustion, region due to the allowed, albeit small, mass flow between a chamber of maximum pressure and its neighbor of lesser pressure at the gap between their common partition and the annular cavity wall. This loss is limited to a fairly constant value due to the choking of flow. The choked flow condition is generally extant throughout most of the compression and combustion regions of the annular cavity if the number of partitions are few. The operating pressure loss due to the mass flow between the volume varying chambers occurs generally only in the volume varying chambers while they are the last chamber with fully combustion involved contents entering the combustion region and to a much lesser extent while they are exiting the compression region. That is when there is a net position mass flow from it to its neighbors. The energy loss due to the positive mass flow and the rate of mass flow per second is generally constant regardless of engine rotation rate. As the mass flow is time dependent, the maximum pressure in the volume varying chambers increase with increased in rotor rotation rate. The greater the number of volume varying chambers last entering the combustion region per second the less mass loss per chamber and the higher the remaining operating pressure.

Inherent in the engine invention is very low torque fluctuation per revolution. A typical four cycle engine having one pair of annular cavity stations and eighteen partitions can have a torque fluctuation of less then five percent. With care in designing the elements of the engine specifically the partition edge surfaces in the annular cavity, shock waves may be generated by the mass flow through the gap to effect the combustion process efficiency of the engine.

BRIEF DESCRIPTION OF THE DRAWINGS

FIG. 22 is a section break away portrayal of an engine as in FIG. 1 but wherein springs means are included in the engine's partition displacing means and metering skirts are used to supply lubricant to the rotor cam means.

FIG. 23 is a section break away end view of the partition retaining casing section of the engine in FIG. 22.

FIG. 24 is an outer circumferential portrayal of a metering skirt section used in the engine in FIG. 22.

FIG. 25 is a side view of a metering skirt section in FIG. 24.

FIG. 26 is an inner circumferential view of the metering skirt section in FIG. 24.

FIG. 27 is an enlarged section break away portrayal of the rotor cam channel and metering skirt as used in FIG. 22.

FIG. 28 is a portrayal of a partition used in FIG. 22.

FIG. 29 is an enlarged view of a metering skirt section as might be used in an engine as in FIG. 1 in place of the lubricant spray nozzles.

FIG. 30 is an enlarged section break away portrayal of the rotor cam channel and metering skirt arrangement for an engine as in FIG. 1 using metering skirt elements as in FIG. 22.

FIG. 31 is an engine as portrayed in FIG. 22 where the partition element displacing spring means are replaced by fluid pressure.

FIG. 32 is a side cut away view of an engine similar to FIG. 1 but wherein the fuel injector means are located in the rotor.

FIG. 33 is an annular cavity end view of the rotor of FIG. 32.

FIG. 34 is a rear break away view of the rotor of FIG. 32.

FIG. 35 is a side section cut away view of an engine as in FIG. 35 but having no casing exhaust or intake means, taken with reference lines C-D of FIG. 44.

FIG. 36 is a side view of the rotor in FIG. 35.

FIG. 37 is an annular cavity end view of the rotor in FIG. 35.

FIG. 55 is break away view of the a sump channel end of the face surface casing section of the engine in FIG. 50.

FIG. 56 is a section break away portrayal of the casing section in FIG. 55 taken with reference to line C—C in FIG. 55.

FIG. 57 is an enlarged side oblique portrayal of the partition assembles used in the engine in FIG. 50.

FIG. 58 is an enlarged side oblique portrayal of the lubricant spray section of the partition assembly in FIG. 57.

FIG. 59 is an enlarged side oblique portrayal of the partition slot section of the partition assembly in FIG. 57.

FIG. 60 is an enlarged side oblique portrayal of the partition element of the partition assembly in FIG. 57.

DETAILED DESCRIPTION AND SPECIFICATION OF THE INVENTION

Figure 1:
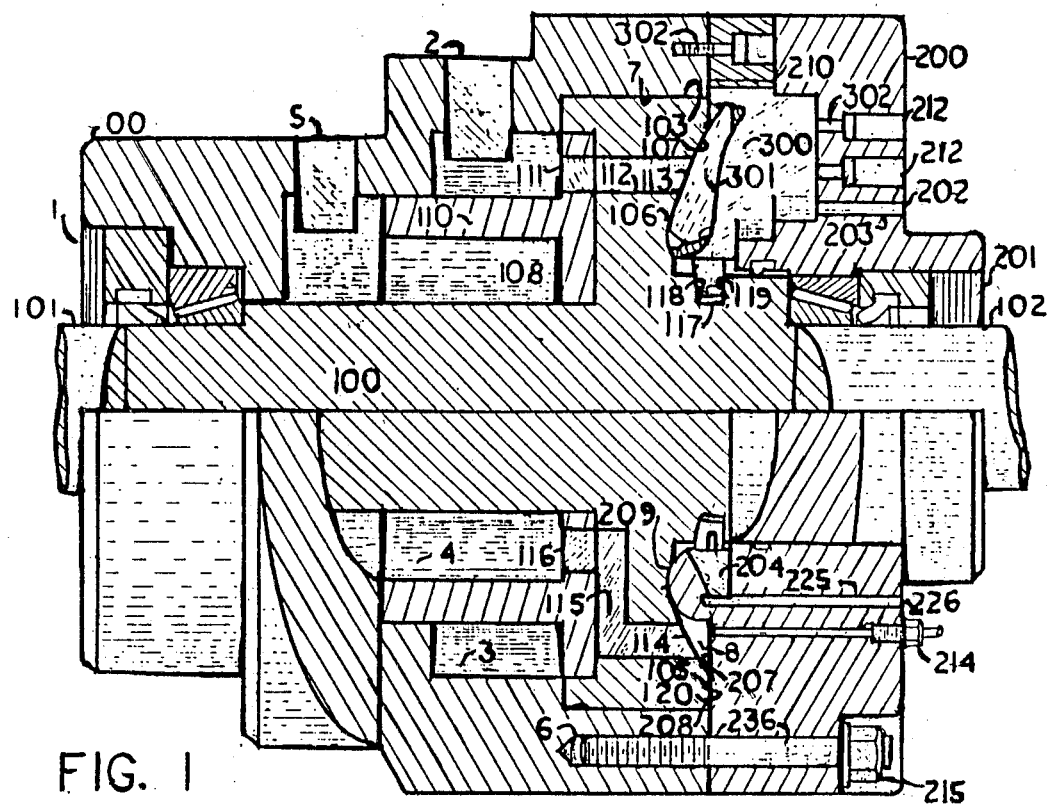
FIG. 1 is a section break away side view of an engine of the invention taken with reference to lines D-E in FIG. 4.

My invention is a rotary internal combustion engine utilizing either a four cycle process or a two cycle process for power generation. The four cycle process comprising; an intake cycle, a compression cycle, an injection-ignition-combustion cycle, and an exhaust cycle. The two cycle process includes an intake-injection-ignition-combustion cycle, and an exhaust cycle.

The invention has a casing and a rotor. The rotor is mounted for journaled rotation in the casing and has at least one power take off means extending from it to outside the engine. In the engine an annular cavity is formed by and between the rotor and the casing and the rotor rotation axis, i.e. the rotor axis, is through the annular cavity center. That is, the annular cavity is circumferential to the rotor axis, i.e. it goes completely around the rotor axis. The rotor has a wave surface at the annular cavity which is circumferential to the rotor axis. The casing has a face surface at the annular cavity. The face surface faces the rotor wave surface across the annular cavity and is also circumferential to the rotor axis. The boundary surfaces of the annular cavity are at least the rotor wave surface and the casing face surface. The rotor has perimeter surfaces to the wave surface at the wave surface perimeters and the casing face surface has perimeter surfaces mating the rotor perimeter surfaces. The rotor wave surface has at least one wave like relief or undulation in a two cycle engine and at least one pair of wave like reliefs or undulations in a four cycle engine. The wave like reliefs or undulation may be sinusoidal in nature. The term "undulation" herein means also "wave like relief".

In the two cycle engine each undulation of the rotor wave surface of the annular cavity is a combustion station. In a four cycle engine the first of each pair of undulations of the rotor wave surface of the annular cavity is a compression station and the second undulation of each pair is the combustion station. In the casing are a plurality of axially oriented slots which are circumferential spaced about the rotor axis. The slots open to the annular cavity across the annular cavity face surface in the direction from one perimeter surface of the face surface to the other.

A partition is mounted in each of the casing slots for axial, pivotal motion therein. Each partition pivotally extends from its slot axially into the annular cavity, and its edge surface in the annular cavity does not abut the annular cavity surface towards which it extends and in portions of the annular cavity there is close proximity between said edge surface and said annular cavity surface.

A plurality of circumferential spaced volume varying chambers are in the annular cavity. A volume varying chamber is in the annular cavity between consecutive partitions.

With the rotor rotation and the consequent traverse of the annular cavity station by the volume varying chambers, the chambers cyclically vary in volume between minimum and maximum volume.

The rotor has a continuous cam means which is circumferential to the rotor axis and located outside the annular cavity. The rotor cam means operatively engages a portion of each partition. Said engagement is, with adequate rotor rotation rate, through hydrodynamic interaction. The operative engagement of the partitions by the rotor cam means effects the pivotal extension of the individual partitions from their slots into the annular cavity keeping the partition's edge surface in the annular cavity extending towards without abutting the cavity surfaces. Said engagement maintains close proximity between the partition edge surface in the annular cavity and the annular cavity surface towards which it extends, at least in the combustion region of the combustion station and in a four cycle engine also in the compression region of the compression station.

Formed in the annular cavity by each partition edge surface therein and the annular cavity surface towards which it extends, in portions thereof to close proximity, is a gap which may also be termed, a channel, a nozzle, or an orifice. The gap allows a small flow of mass form a volume varying chamber to its neighbor of lesser pressure. This mass flow is minimized in the engine by maintaining the area of the gap opening small during the partition's traverse of the annular cavity at least in the combustion region of the combustion station and in four cycle engines also in the compression region of the compression station. In engine operation the rotor cam means operative engagement with the partitions, which continuously adjusts the partitions' pivotal extension from their slots into the annular cavity, maintains the gaps between the partitions edge surfaces in the annular cavity and the cavity surfaces towards which they extend in their traverse of the annular cavity with rotor rotation. The rotor cam means operative engagement with the partitions also maintains the close proximity between their edge surfaces in the annular cavity and the annular cavity surfaces towards which they extend in the combustion region and when extant the compression region. The above pivotal motion of the partitions in their slots may be effected by the rotor cam means coacting with a mechanical means such as a spring or a hydraulic piston also acting on the partitions.

The mass flow between neighboring volume varying chambers may also be minimized when designing an engine of the invention by using choked mass flow conditions in the annular cavity. Choked mass flow conditions allows only a certain maximum mass flow rate between chambers regardless of how great the pressure difference between the chambers. Because of the gaps the wear of engine parts within the annular cavity with the temperature extremes therein is negligible. Also, the loss of work ability of the engine incurred if wiping abutment between relatively moving parts in the annular cavity were required is replaced by the much smaller loss in work ability of the engine due to the drop of pressure in the volume varying chambers consequent to the above noted mass flow.

The gap also allows the continuation of the combustion process in the engine without the use of sophisticated ignition systems. The flow of combustion involved mass to the freshly fuel injected compressed contents of the volume varying chambers at the start of the combustion region of the combustion station initiates the combustion processes in the chamber. Once the combustion process is initiated in the annular cavity, either by auto ignition or auxiliary ignition means, it is self perpetuating due to the gaps.

In the compression station of a four cycle engine's annular cavity the region of the station where traversing volume varying chambers increase in volume is the intake region of the compression station and the annular cavity. The intake region of the annular cavity has intake means which allow the uptake of substances from outside the engine by the volume varying chambers traversing the region. The annular cavity intake means are supplied by apertures, channels and ports of the engine to outside of the engine. The intake means to the annular cavity are preferably located at least in the rotor thereby removing the necessity of valves and timing mechanisms for the sequential operation of intake means to the annular cavity located in the casing at each volume varying chamber. The region of the compression station where the traversing volume varying chambers decrease in volume is the compression region of the compression station and the annular cavity. It is in this region that the contents of the volume varying chambers are compressed by the rotor with rotor rotation.

The combustion station of the annular cavity in the four cycle engine begins where the volume varying chambers achieve a minimum volume after traversing the compression station. The region of the combustion station from the stations beginning through that portion of the station in which traversing volume varying chambers increase in volume is the combustion region of the combustion station and annular cavity. Volume varying chambers traversing the first portion of the combustion region are fuel injected and their fuel injected contents are ignited. The fuel injector means may be located in the casing at the volume varying chambers in the annular cavity, which requires a relatively complex support system outside the engine for the proper operation of the injector means. The fuel injection means might otherwise be located in the rotor at the annular cavity with fuel injected into the volume varying chambers as they pass over the fuel injector nozzle in their traverse of the annular cavity. The fuel injection means in the rotor may include besides such fuel control valves as necessary, fuel pumping means in addition to the pumping of fuel intrinsic to rotor rotation. Though the additional pump means are not always necessary they allow proper injector operation at low rotor rotation rates and are preferably located in the rotor using the rotor to casing relative movement as motive force. The rotor location of the pump is preferred to keep the fuel input pressure at the rotor fuel intake port manageable by state of the art seal means. Additional injection nozzles located in the combustion region where the volume varying chambers contents are fully combustion involved may be used for increased performance.

The high pressure developed by the combustion processes occurring in the volume varying chambers in the combustion region of the annular cavity acts on the rotor wave surface driving the rotor in rotation for the engine's mechanical power output.

The region of the combustion station in which traversing volume varying chambers decrease in volume is the exhaust region of the combustion station and annular cavity. It is in the exhaust region that the annular cavity has exhaust means, preferably in the rotor with channeling at least in the rotor for the expulsion of the products of combustion contents from the volume varying chambers in the region to outside the engine.

With traverse of the exhaust region of the combustion station the volume varying chambers arrive again at a minimum volume and with further rotor rotation enter again the compression station to repeat the power generation cycle.

In an engine with a four cycle power generation sequence, the first cycle, the intake cycle, occurs in the intake region of the annular cavity, the second cycle, the compression cycle, occurs in the compression region of the annular cavity, the third cycle, the injection-ignition-combustion cycle, occurs in the combustion region of the annular cavity and the forth cycle, the exhaust cycle, occurs in the exhaust region of the annular cavity. Of course the cycle of operation refers to the volume varying chambers and their contents in the various regions of the annular cavity.

In engines utilizing two cycle power generation, the beginning of the combustion station which is also the beginning of the combustion region in the annular cavity has an intake means for the admission of substances under high pressure to the volume varying chambers with which it communicates. High pressure is that pressure necessary for effective combustion processes in the volume varying chambers. The intake means may be at the casing at each volume varying chamber in the annular cavity which requires mechanisms similar to those for the intake means in the casing in the four cycle engine. It is preferred that the intake means for supplying substances under high pressure to the volume varying chambers be located in the rotor at the annular cavity. This allows a continuous supply of substances under high pressure to the annular cavity from a source outside the engine via apertures, channels and ports of the engine. Thus the intake means in the rotor supplies substances under high pressure to each volume varying chamber communicating with it in their traverse of the annular cavity.

The rest of the two cycle power generation process is similar to the last two cycles of the four cycle system already discussed. The volume varying chambers are fuel injected, ignited, and the pressure developed by the combustion processes in the chambers drive the rotor in rotation for mechanical power output. The volume varying chambers arrive at a maximum volume in the combustion station and enter the exhaust region of the annular cavity expelling their products of combustion contents to outside the engine via exhaust means at the region either in the casing at each volume varying chamber or preferably in the rotor. The volume varying chambers exiting the exhaust region of the annular cavity arrive at a minimum volume and with further rotor rotation continue traversing the annular cavity beginning again the two cycle power generation process with re-entry into the beginning of the combustion region of the combustion station.

The following is an explanation of a few terms used in the description.

The terms "axial orientation", "axially oriented" and "axially" mean to be oriented in a plane containing the rotor axis or in a slightly displaced parallel plane or a slightly askew plane to a rotor axis containing plane. It also means to be in a space or occupy space bounded by such planes.

The terms "axial motion" and "axially directed motion" means to have all points on the moving element describe loci of points that are axially oriented.

The term "rotor axis" means the axis of rotor rotation.

The terms "mating", "mating surfaces" and "mate" means that the spatial configuration of a surface to the surface it "mates" is such that relative motion required between the two surfaces is freely allowed while the surfaces are very close together generally at a constant distance. It is usually at the mating surfaces that seals are extant. A seal is on one of the mating surfaces with wiping abutment with the other of the mating surfaces.

The terms "seal" and "seal means", keeping in the spirit of the invention, is modified from the conventional meaning to include mass flow limiting means where their use is operatively possible. Seals between mating surfaces may be other then absolute seals. Seals in the engine at the mating perimeter surfaces of the rotor wave surface and the casing face surface may simply be mass flow limiters which allow some passage of high pressure gas mass. This is done to avoid the seal wear and work loss that would result with use of effective positive type wiping seals.

The term "(in) close proximity" means to be very close together without abutting. Typically the close proximity of the partitions edge surfaces to the angular cavity surfaces towards which they extend in present designs will range from a few ten-thousandths of an inch to one to three thousandths of an inch. The actual distance of the "close proximity" will vary due to the variation in the rotor cam fluid film thickness with location, rotor rotation rate, the precision of the partitions low friction bearings and of course general tolerances allowed in construction.

The term (partitions) "edge surface" means, beside a single surface as the curved surfaces in the illustrations, also edge surfaces i.e. a plurality of surfaces as in an engine with an annular cavity and partitions with a polygonal and/or multicurved profile where the partition "edge surface" in the annular cavity means all of its edge surfaces in the annular cavity. The "edge surface" also means the plurality of surfaces comprising the edge surface as when said surface has lengthwise steps, corrugations or the like as might be used to further restrict mass flow or from shock waves.

The term (partitions) "pivot point" refers to the point in the engine where a bisecting axial plane of the partition intersects the partition's axis of rotation in its slot.

The term "substances" herein is limited in meaning to noncombustible combustion supporting substances.

FIGS. 1 through 17 portray a four cycle version of the engine with one pair of stations in the annular cavity. The rotor has a cylindrical like shape and is mounted in a cylindrical like cavity in the casing for journaled rotation. The rotor has an intake aperture and the casing has an intake channel and an intake port arranged to allow the continuous flow of substances, from outside the engine to the intake region of the annular cavity. The rotor has an exhaust aperture and the casing has an exhaust channel and an exhaust port arrange to allow the continuous explusion of the products of combustion from the exhaust region of the annular cavity to outside the engine. The rotor wave surface and the casing face surface which form the annular cavity of the engine are lateral to one another along the rotor axis. A fuel injection means nozzle is located in the annular cavity at each volume varying chamber at the face surface. The partitions are mounted in partition assembles which in turn are mounted in circumferential spaced, axially oriented casing slots. The partition assembles also supply lubricant to the rotor cam means. The rotor cam means is a pair of undulating continuous side walls, the cam surfaces, of an open circumferential channel in the rotor, the rotor cam channel, about the rotor axis. The rotor cam channel with respect to the rotor axis is radially interior the annular cavity. Each partition assembly in the engine has a cylindrical like extension with closed end in the rotor cam channel and open end in the the partition assembly communicating with lubricant supply channels therein. The cylindrical extension in the cam channel has small opening in its walls through which lubricant is projected into the cam channel for the cam surfaces therein. In the engine a portion of each partition extends into the cam channel. The extending portion has edge surfaces to interact with the rotor cam surfaces hydrodynamically to control the partition's pivotal movement from its slot in the annular cavity.

In the engine of FIG. 1, casing sections 00 and 200 are retained together by tie bolt means combination 6 and 215. In the casing cavity and mounted for journaled rotation is rotor 100 which is cut with reference to lines D-E of FIG. 4. Cylindrical surface 7 of casing section 00 mates the outer cylindrical surface 103 of the rotor. The rotor has power take-off shafts 101 and 102 extending from it to outside the casing through mating casing openings 1 and 201 respectively. Shown in the figure is a volume varying chamber 8 which is located in the intake region of the compression station in the annular cavity. The annular cavity is formed between the rotor wave surface 107 and the casing face surface 207. The face surface has a portion 206 extending laterally to the rotor at the inner diameter of the annular cavity. Surface 206 becomes the face surface inner perimeter boundary surface 209 when mated by the inner perimeter boundary surface 104 of the rotor. The face surface 207 has an outer portion that when mated by the rotor wave surface outer perimeter boundary surface 120 becomes the outer perimeter boundary surface 208 of the face surface. The rotor has at its inner perimeter boundary surface 104 seal means 106 and at its outer perimeter boundary surface 120 seal means 105. Shown also in the figure is partition assembly 300 broken away with the partition 301 extending into the annular cavity towards without abutting the rotor wave surface 107. The assembly 300 is retained in casing section 200 partition assembly retaining slots 210 by retainers 302 in casing retainer channels 212. The assembly 300 is retained to casing section 00 by fastener 302 in the threaded casing channel 10. Shown is the rotor's open cam channel 117 with its cam surface side walls 118 and 119. Lubricant from the lubricant supply elements 303 of the partition assemblies is supplied to the rotor cam surfaces 118 and 119 for their hydrodynamic operative engagement with the partitions. The partition assemblies in turn are supplied with lubricant for both themselves and the rotor cam surfaces via lubricant channels 203 in the casing section 200 each of which connects through port 202 to a lubricant supply outside the engine. The rest of the lubricant supply circuit in casing section 200 is completed by the sump channel 204 in which excess lubricant is accumulated and drained from the engine via the channels 225 each with exit port 226 to outside the engine. Shown is fuel injector means portion 214 by which fuel is injected, at least at the beginning of the combustion region of the annular cavity, into the volume varying chamber 8 it serves. Each volume varying chamber 8 of the annular cavity 9 has its own fuel injector means portion 214. The elements 214 are supplied by fuel pumping and timing means outside the engine. The porting plate 108 of the rotor has cylindrical extension 110 into the casing section 00 cylindrical cavity behind the rotor which divides the cavity into two annular cavities, 3 and 4, with cavity 4 interior cavity 3 with respect to the rotor axis. Annular cavity 3 is casing exhaust channel 3. Annular cavity 4 is casing intake channel 4. The term "annular cavity" is hereafter restricted to mean the annular cavity 9 of the engine. The intake circuit for the continuous supply of substances from outside the engine to the volume varying chambers in the intake region of the annular cavity is via casing section 00 intake port 5, to intake channel 4. Intake channel 4 communicates with the rotor intake aperture 115 (formed in part by the rotor and the rotor porting plate 108) through porting plate aperture 116. The rotor intake aperture 115 has exit 114 in the rotor wave surface 107 at the intake region of the annular cavity which communicates with volume varying chambers therein. The circuit for the expulsion of the products of combustion from the volume varying chambers in the exhaust region of the annular cavity is via their communication with the rotor exhaust aperture 112 through its entry 113 in the rotor wave surface 107. The exhaust aperture 112 communicates with casing exhaust channel 3 through porting plate aperture 111. The casing exhaust channel 3 has exhaust port 2 to outside the engine.

Figures 2, 3:
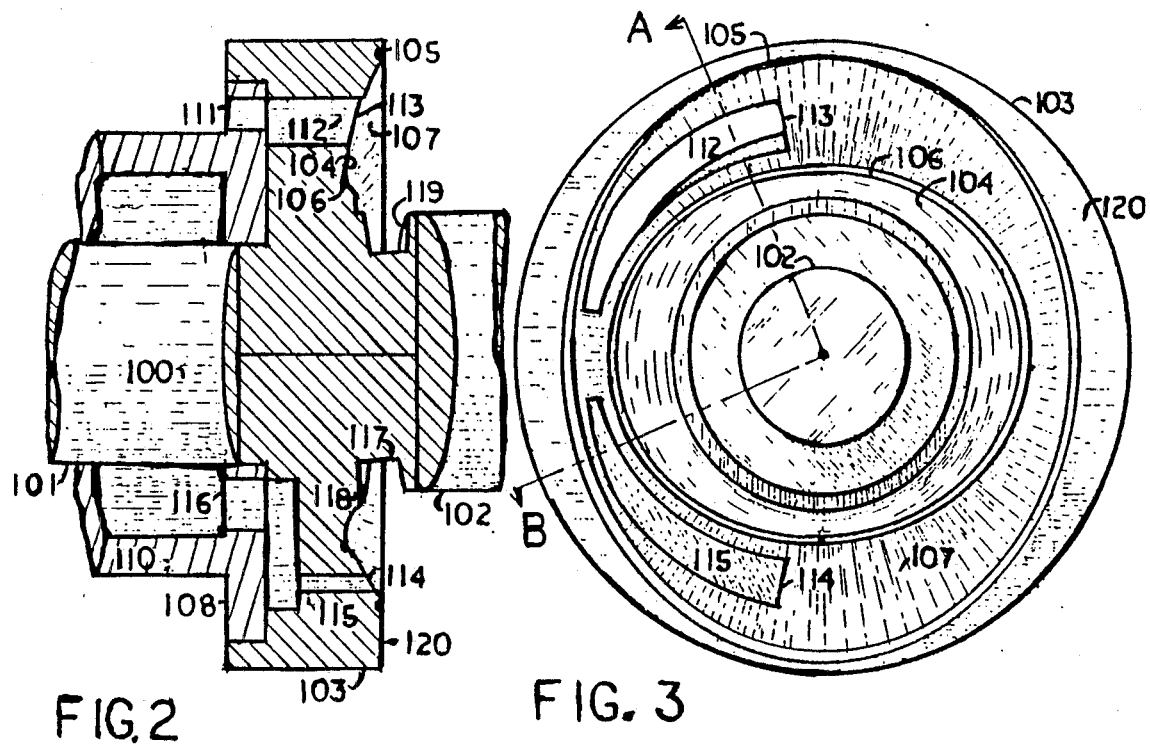
FIG. 2 is a side section break away view of the rotor element of the engine in FIG. 1 taken with reference to lines A-B in FIG. 3.
FIG. 3 is wave surface end view of the rotor element of FIG. 1.

FIG. 2 is a side portrayal of the engine rotor element 100 which is cut with reference to lines A-B of FIG. 3 and the rotor porting plate 108 cylindrical extension 110 along with the rotor power take-off shafts 101 and 102 are broken away. Shown is the rotor wave surface 107 in profile illustrating its concave nature. Also in profile is cam channel 117 with its side walls the undulating cam surfaces 118 and 119 that operatively engage the partitions 301 for their pivotal motion from their slots into the annular cavity. Shown also is the inner perimeter boundary surface 104 which mates to inner perimeter boundary surface 209 of surface 206 of the face surface 207 which extends to the rotor. The outer perimeter boundary surface 120 of the rotor is shown. Surface 120 mates the outer perimeter boundary surface 208 of the face surface 207. Shown is entry 113 in the rotor wave surface 107 of the exhaust aperture 112 and the communication of aperture 112 via the exhaust aperture 111 of the rotor porting plate 108 to the radial exterior of the rotor porting plate cylindrical extension 110. The intake aperture 115 of the rotor with exit 114 in rotor wave surface at the intake region of the annular cavity, and its formation in part by the rotor and rotor porting plate is shown along with its communication via intake aperture 116 of porting plate with the radial interior of the rotor porting plate cylindrical extension.

FIG. 3 is a wave surface end view of the engine rotor 100 which illustrates the area variations of the inner perimeter boundary surface 104 and the outer perimeter boundary surface 120 to the rotor wave surface 107, and thus the change of location of the mating perimeter boundary surfaces of the face surface 209 and 208 respectively. Shown are seal means 105 and 106 of perimeter boundary surfaces 120 and 104 respectively.

Figure 4:
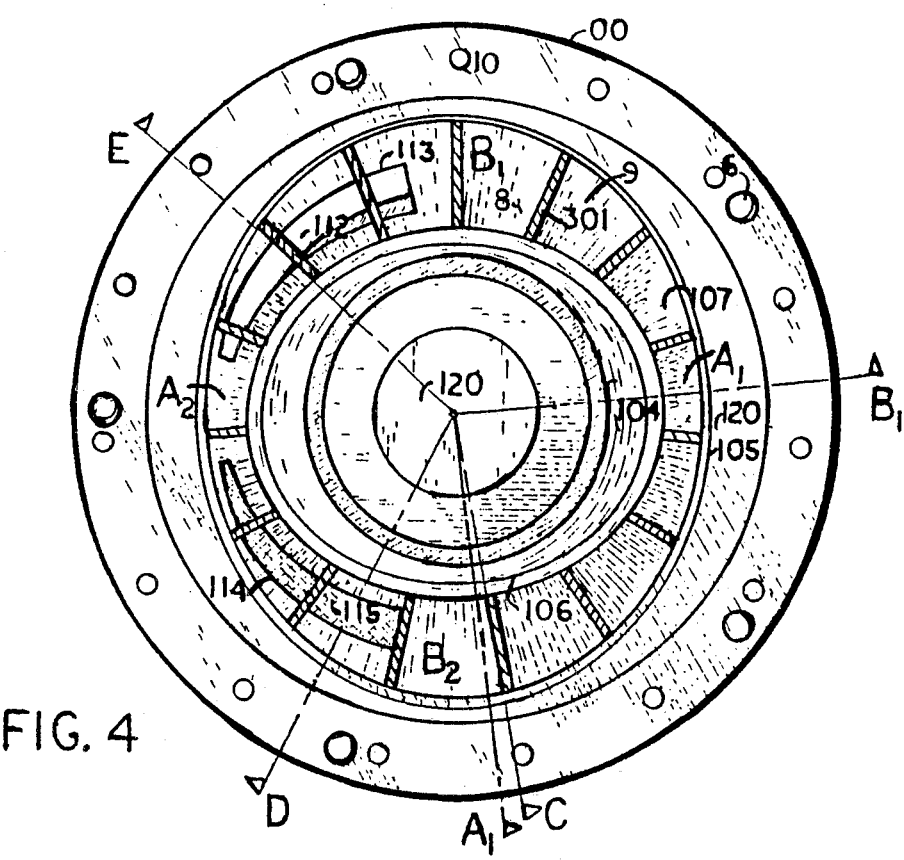
FIG. 4 is an end view of the rotor element mounted in casing section 00 of FIG. 1 taken from the annular cavity side.

FIG. 4 is a wave surface end view of the rotor 100 mounted in casing section 00. It shows the annular cavity with the plurality of partitions 301, in their extension into the annular cavity and the annular cavity surface, the wave surface 107, towards which they extend. The partitions are cut at the face surface of the annular cavity, i.e. where they exit their slots. Shown is the annular cavity 9 with its plurality of circumferential spaced volume varying chambers 8, each formed between consecutive pairs of partitions 301. Shown is the communication between volume varying chambers in the exhaust region of the annular cavity and the rotor exhaust aperture 112 through its entry 113 in the rotor wave surface 107 and the communication between volume varying chambers in the intake region of the annular cavity and the rotor intake aperture 115 through its exit 114 in the rotor wave surface. Shown are the casing section 00 tie rod means 6 which in the engine extend through casing section 200 retainer channels 236, and are joined by the washer nut combinations 215. Also shown are the threaded retaining channels 10 used to secure the partition assembles 300 to the casing section 00.

Figure 5:
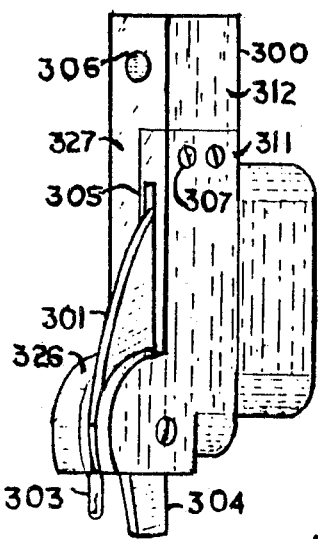
FIG. 5 is an enlarged side oblique view of a partition assembly of the engine in FIG. 1.

FIG. 5 is an enlarged oblique view of a partition assembly 300 with its two major sections 312 and 311. Section 312 contains lubricant channeling and lubricant spray element 303 which in the engine extends into the rotor cam channel 117. The section 311 contains the partition 301 in its slot 305 wherein it is journaled for low friction pivotal motion. In the engine each partition assembly is retained in an axially oriented slot 210 of casing section 200 and the partition slot 305 of the assembly thereby also has axial orientation and the pivotal motion of partition 301 from the partition assembly into the annular cavity is axial. The major portions of the assembly are retained together by screws 307 and the assembly has channel 306 through which threaded fastener 302 extends into threaded channel 10 of casing section 00 for the assembly's retention thereto. The surface 327 is the partition assemblies continuation of the face surface 207 of the annular cavity as is surface 326 the continuation of surface 206. Extension 304 of the partition 301 extends into the rotor channel 117 for engagement with its the cam surface side walls 118 and 119.

Figure 6:
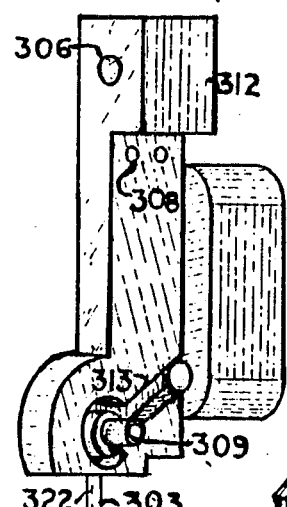
FIG. 6 is an enlarged side oblique view of the lubricant supply section of the partition assembly in FIG. 5.

FIG. 6 is an enlarged oblique view of the spray element section 312 of the partition assembly 300. Shown are the threaded channels 308 for fasteners 307 and lubricant channels 313 in the assembly which connects lubricant spray element 303 to the casing lubricant channel 202 for the continual supply of lubricant to the rotor cam channel 117 through the small openings 322 in the walls of the spray element. Shown is the cylindrical extension 309 of assembly section 312. In the partition assembly the partition 301 with low friction bearing 310 mounts on cylindrical extension 309 which extends into the partitions slot 305 in section 311 for its pivotal motion therein and extension therefrom.

Figure 7:
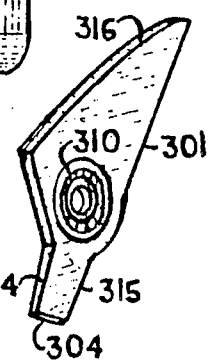
FIG. 7 is an enlarged side oblique view of the partition of the partition assembly in FIG. 5.

FIG. 7 is an enlarged oblique view of a partition 301 illustrating the edge surfaces 314 and 315 of the partition extension 304 which in the engine interact with cam surfaces 118 and 119 respectively of the rotor cam channel 117. Also shown is the partition edge surface 316 which in the engine extends towards, without abutting, the rotor wave surface 107 and forms therewith an orifice connecting the volume varying chambers 8 in the annular cavity 9 on either side of the partition. Edge surface 316 is in close proximity to the rotor wave surface in the combustion and compression regions of the annular cavity.

Figure 8:
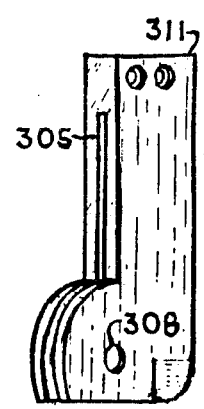
FIG. 8 is an enlarged side oblique view of the partition retaining portion of the partition assembly in FIG. 5.

FIG. 8 is an enlarged oblique protrayal of the partition retaining section 311 of the partition assembly with the partition removed. Shown is the slot 305 in which the partition 301, with low friction bearing 310, mounts on cylindrical extension 309 of assembly section 312 for pivotal motion.

Figure 9:
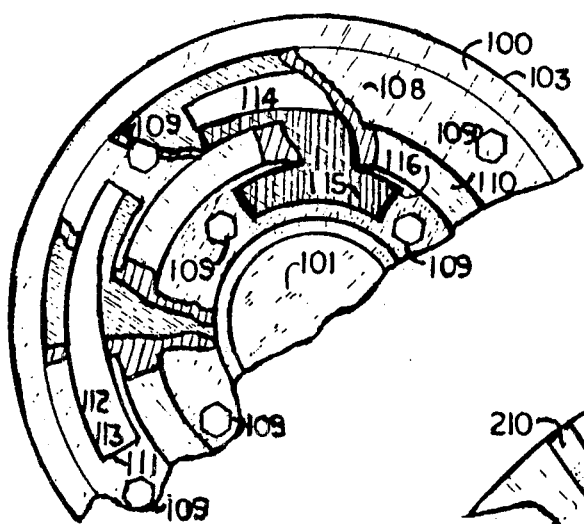
FIG. 9 is a section break away end view of the rotor element portrayed in FIG. 3.

FIG. 9 is a broken away porting plate end view of the rotor. The rotor porting plate 108 is broken away to illustrate the exit 114 in the rotor wave surface 107 of the rotor intake aperture 115, the partial formation between the rotor and rotor porting plate 108 of intake aperture 115, and its means of communication, the portion plate intake aperture 116, with casing intake channel 4 interior the rotor cylindrical extension 110. Shown also is the rotor exhaust aperture 112 with entry 113 in the rotor wave surface 107 and its means of communication, the rotor porting plate exhaust aperture 111, with casing exhaust channel 3. Shown are the fasteners 109 securing the rotor porting plate 108 to the rotor 100.

Figure 10:
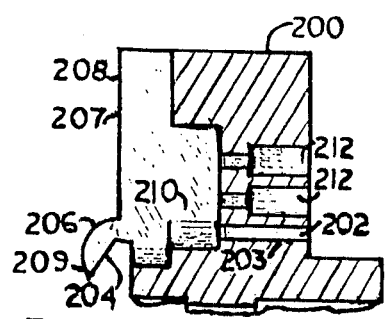
FIG. 10 is a section break away view of the partition assembly retaining slot in the casing of the engine in FIG. 1 taken with reference to line F—F of FIG. 11.
Figure 11:
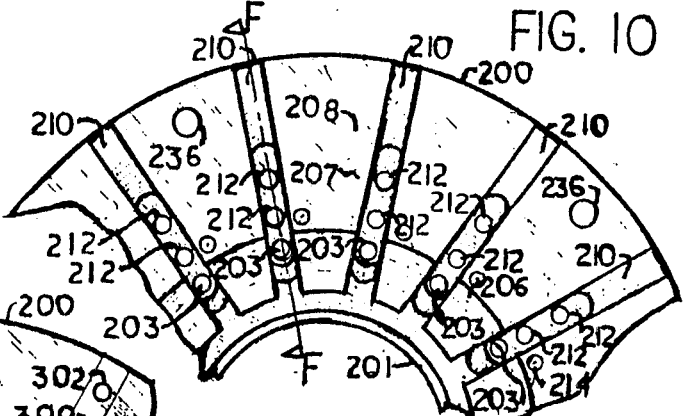
FIG. 11 is a break away view of the face surface side of the casing section 200 of FIG. 1 with the partition assembles removed.

FIG. 10 is a broken away section portrayal of casing section 200 cut at a slot 210 with reference to line F—F of FIG. 11. Illustrated in profile are the slot 210, the lubricant sump channel 204, the face surface 207 of the annular cavity with its surface portion 206 which extends to the rotor, its outer perimeter boundary surface 208 and its inner perimeter boundary surface 209. Also shown are the retainer channels 212 through which retainers 302 extend for retention of a partition assembly 300 in the casing slot 210. Shown is lubricant supply channel 203 with casing entry port 202. In the engine, channel 203 communicates with lubricant supply channeling 313 of the partition assembly 300 in slot 210, for the transfer of lubricant from outside the engine to the assembly and rotor cam channel.

FIG. 11 is a broken away annular cavity end view of the casing section 200. It illustrates a portion of the circumferential spaced, axially oriented, partition assembly retaining slots 210 and the channels therein. Also shown are the face surface 207 and its portion 206 along with the outer perimeter boundary surface 208 and the inner perimeter boundary surface 209. Also shown are the retainer channels 236 through which the tie rods 6 extend, and a fuel injector mean's nozzle 214 at the face surface of the annular cavity at each volume varying chamber.

Figure 12:
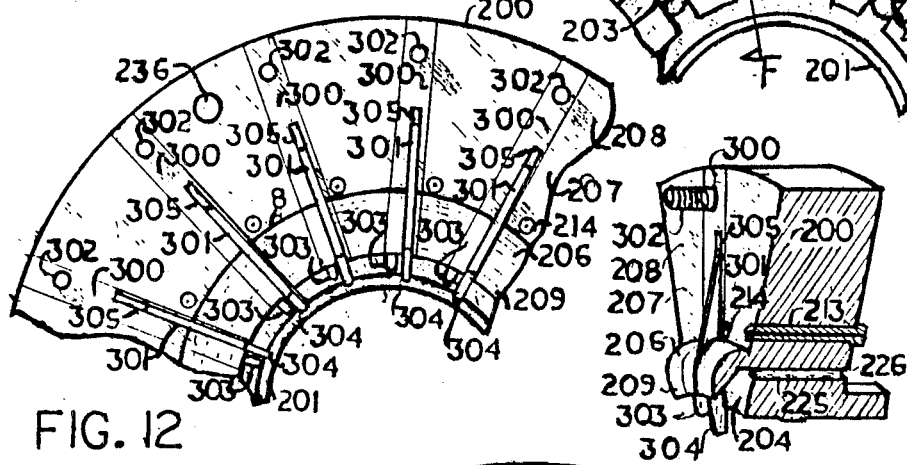
FIG. 12 is a view as in FIG. 11 but with the partition assembles in place.

FIG. 12 is similar to FIG. 11 but with the partition assembles 300 mounted in their slots 210 in casing section 200. Shown are the partitions 301 mounted in their slots 305 and extending therefrom and from the face surface 207, as they would extend in the engine into the annular cavity. Partition assembly surface 327 is part of face surface 207 in the engine. Between the partitions 301 the volume varying chambers 8 are formed in the engine annular cavity. Also shown are the partitions extensions 304 and the partition assembly lubricant spray extension 303. Both in the engine extend into the rotor cam channel 117.

Figure 13:
FIG. 13 is an oblique section break away view of the casing in FIG. 12.

FIG. 13 is an oblique section break away view of the casing section 200 illustrating the extension of partition 301 from its slot 305 and from the face surface 207 as it would extend in the engine into the annular cavity 9 forming a volume varying chamber 8 on either side therein. Shown is the arrangement of the sump portion of a lubricant supply circuit in the engine comprising sump channels 204,225 and sump port 226 to outside the engine. Shown is the auxiliary ignition means 213 which may be used to initiate combustion in the combustion region of the annular cavity when auto ignition is not used for initiating combustion at engine start up. It may also be used to aid in sustaining the combustion process.

Figure 14:
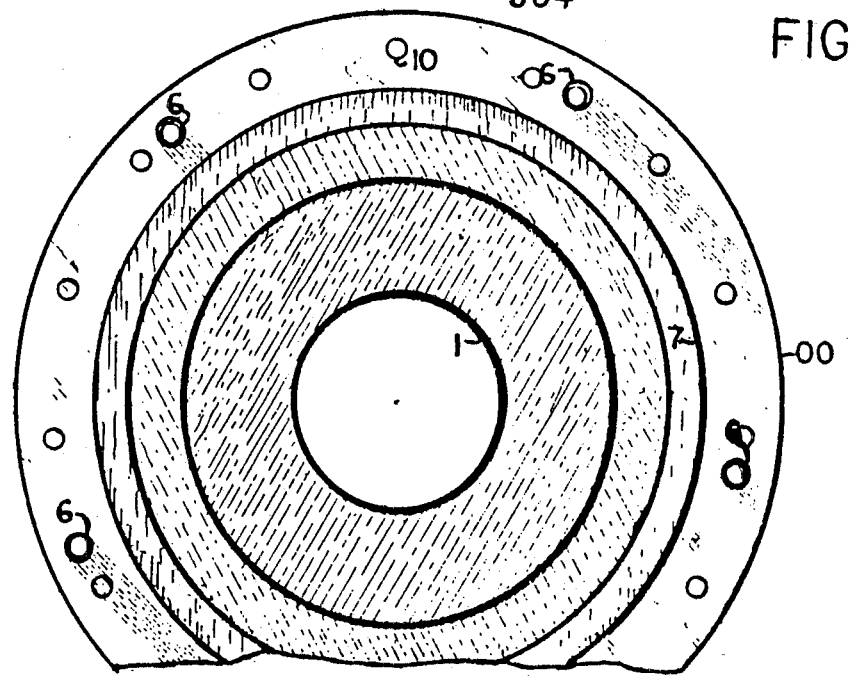
FIG. 14 is a view of the rotor end of casing section 00 of FIG. 1.

FIG. 14 is an end view from the rotor side of the casing section 00 broken away. It shows tie rods 6 of retaining assembly 215 and threaded channels 10 for partition assembly retainers 302. Also shown are the center opening 1 through which the rotor power take-off shaft 101 extends and cylindrical surface 7 which mates the rotor cylindrical surface 103.

Figure 15:
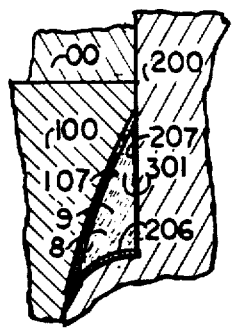
FIG. 15 is a representational section beak away view of the annular cavity of the FIG. 1 engine taken with reference line $A_1$ of FIG. 4.

FIG. 15 is an enlarged section representational profile view of the annular cavity of the engine taken with reference to line A1 of FIG. 4. A volume varying chamber 8 in annular cavity 9 is shown bounded by the partition 301 in the annular cavity and the boundary surfaces of the annular cavity, the rotor wave 107 and the face surface 207 with surface portion 206 extending to the rotor. The volume varying chamber in this drawing has an almost maximum volume.

Figure 16:
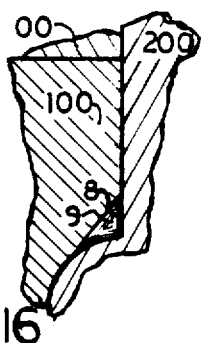
FIG. 16 is a portrayal of the annular cavity as in FIG. 15 but taken with reference to line $B_1$ of FIG. 4.
Figure 17:
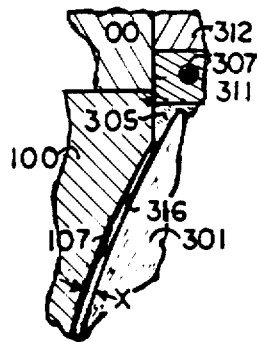
FIG. 17 is a portrayal of the annular cavity as in FIG. 15 but taken with reference to line C of FIG. 4.

FIG. 16 is a portrayal as in FIG. 15 but taken with reference to line B1 of FIG. 4. The volume varying chamber in this drawing has an almost minimum volume. P FIG. 17 is a portrayal as in FIG. 15 taken with reference to line C in FIG. 4 and is greatly enlarged. Shown with great exaggeration is the gap, dimensionally denoted as "X" between the edge surface 316 of partition 301 and the rotor wave surface 107, i.e. the annular cavity surface towards which it extends. In the engine the partition edge surface extension towards without abutting the annular cavity surface toward which it extends including said close proximity is maintained by the variation in partitions pivotal axial extension from its slot into the annular cavity during rotor rotation and its consequent traverse of the annular cavity. The variation in pivotal extension of the partition into the annular cavity is effected by the operative engagement, through hydrodynamic interaction, between the edge surfaces 314 and 315 of its extendions 304 and the cam surfaces 118 and 119 respectively of the rotor cam channel 117. The gaps, otherwise termed channels or orifices, formed by the partitions edge surfaces in the annular cavity and the rotor wave surface permits communication between consecutive volume varying chambers at the rotor wave surface. It is through the gap that mass flow between the volume varying chambers occurs.

Looking to FIG. 4 for discussion of the engines operation, the region A2 is a region in the annular cavity where the volume varying chambers have a minimum volume and is located between exit 114 to the annular cavity in the rotor wave surface of the rotor intake aperture 115 and entry 113 to the annular cavity in the rotor wave surface of the rotor exhaust aperture 112, i.e. between the intake region and exhaust region of the annular cavity. In engine operation the rotor turn clockwise and taking a volume varying chamber in A2 region said chamber traverses the intake region of the annular cavity, located between A2 and B2 in the figure. The intake region is a part of the compression station of the annular cavity. The compression station is located between A2 and A1 and includes B2 in the figure. With its traverse of the intake region the volume varying chamber increases in volume taking in substances which are supplied to it by exit 114 of the rotor intake aperture 115 at the region. The volume varying chamber then arrives at the B2 region of the annular cavity and where it has a maximum volume and no longer communicates with the intake aperture 115 of the rotor. With further rotor rotation the volume varying chamber traverses the compression region of the annular cavity, located between B2 and A1, and therein decreases in volume until it arrives at A1 where it has a minimum volume. During the chamber's traverse of the compression region of the annular cavity the rotor works on the substances in the chamber, compressing them. Our topic volume varying chamber when in the A1 region of the annular cavity, is in the beginning combustion region of the combustion station which in the figure extends from A1 to A2 and includes B1. A1 regions extent may be more then one volume varying chamber in circumferential arc length. It is in the A1 region that the volume varying chamber's fuel injector nozzle 214, projects fuel into the chamber. Said nozzle is located at the chamber in the face surface 207 between the chamber's boundary partitions 301. If combustion is not already initiated in the annular cavity it may be initiated in the volume varying chamber automatically with injection of fuel due to the ambient temperature and pressure therein. Or combustion of the chambers contents may be initiated by the auxiliary ignitor means 213 if the topic chamber has an auxiliary ignitor. If our topic chamber has no auxiliary ignitor then combustion would first be initiated in the combustion region of the annular cavity by a volume varying chamber with an auxiliary ignitor means after which the topic chamber's contents would be ignited as in normal engine operation, that is by the flow of combustion involved mass into it through the channel formed between the rotor wave surface and the edge surface 316 of the common boundary partition with its neighbor, with combustion involved contents, preceding it in the combustion region. The pressure due to the combustion processes in the volume varying chamber in the combustion region acts on the rotor wave surface driving the rotor in rotation for mechanical power output. With rotor rotation the volume varying chamber traverses the combustion region of the combustion station which in FIG. 4 is located between A1 and B1. With said traverse and while the pressure of its combustion involved contents act on the wave surface driving the rotor in rotation the topic chamber increases in volume until it has a maximum volume and is in the B1 region of the annular cavity. With further rotor rotation the volume varying chamber is in the exhaust region of the annular cavity which extends from B1 to A2 in the combustion station. The topic volume varying chamber in the exhaust region communicates with intake 113 in the rotor wave surface of the rotor exhaust aperture 112 and thereby expels its products of combustion contents from the annular cavity while decreasing in volume with its traverse of the region. The chamber arrives at a minimum volume and is again located at A2 in the annular cavity and with further rotor rotation begins again the four cycle power generation process. All the volume varying chambers of the annular cavity in their traverse of the annular cavity, with engine operation function as the topic volume varying.

Making the beginning region, the A1 region, of the combustion region in the engine slightly greater then two volume varying chambers in arc length and limiting the significant temperature and pressure increase in the region to the volume varying chamber closest the remainder of the combustion region by fuel injection timing and/or location, eliminates the need for the volume varying chamber at the end of the compression region to work on high temperature and pressure mass back-flow to it that would occur if the combustion involved chamber were adjacent to it. If the combustion involved chamber were adjacent to the compression region in the engines there would be a significant increase in the pressure of the last volume varying chamber in the compression region which the rotor would work against in its continued compression of said chamber's contents. This internal loss is made negligible in the above manner and if extant is not prohibitive and inversely proportional to the rotor rotation rate.

Figure 18:
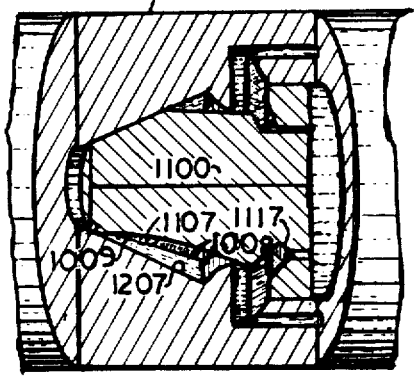
FIG. 18 is a section break away portrayal of another embodiment of my engine wherein the annular cavity is between the inner cylindrical surface of the casing cavity and outer cylindrical like surface of the rotor in the casing.
Figure 19:
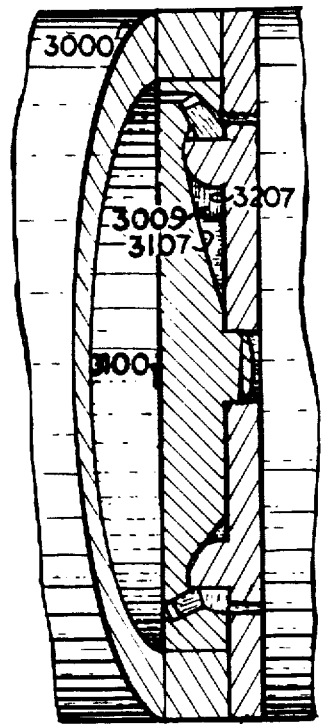
FIG. 19 is a section break away portrayal of another embodiment of my engine with rotor to casing arranged as in FIG. 1 but with the partitions pivot points outside the outer circumference of the annular cavity.
Figure 20:
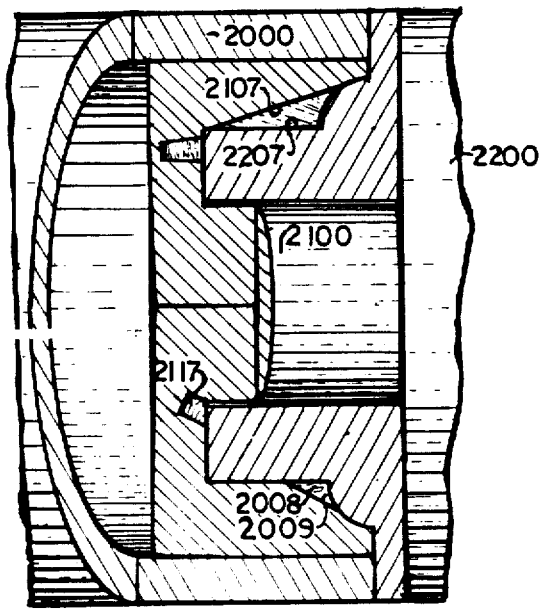
FIG. 20 is a section break away portrayal of another embodiment of my engine wherein the casing at the annular cavity is cylindrical and interior the cylindrical like inner surface of the rotor at the annular cavity.

FIGS. 18 through 20 illustrate three of the many possible arrangements of the rotor wave surface and the casing face surface, i.e. annular cavity boundary surfaces, with reference the partitions pivot points and about the rotor axis in an engine design of the invention. That is, the profile formed in an axial plain cutting the annular cavity at a partition, may be oriented any portion of a complete revolution about the partitions pivot point in designing an engine of the invention.

FIG. 18 is a representational section break away side view of an engine of the invention with an annular cavity 1009 between face surface 1207 of casing section 1200 and wave surface 1107 or rotor 1100. The rotor wave surface 1107 is radially interior the casing face surface 1207 with which it forms the annular cavity about the rotor axis. Shown also are the rotor cam channel 1117, annular cavity 1009 and volume varying chamber 1008.

FIG. 19 is a representational section break away side view of an engine of the invention with the annular cavity 3009 formed between wave surface 3107 of the rotor 3100 and face surface 3207 of the casing section 3200 which are lateral to one another along the rotor axis as in FIG. 1. But unlike FIG. 1 which has a smaller radial distance between the rotor axis and the partitions pivot points then the smallest radius of the annular cavity, the portrayed engine partitions pivot points are at a greater radius to the rotor axis then the greatest radius of the annular cavity.

FIG. 20 is a portrayal as in FIGS. 18 and 19 but with the rotor wave surface 2107 at a greater radius to the rotor axis then is the face surface 2207 of the annual cavity 2009 formed between the wave surface and the face surface. Also the rotor cam means 2117 has a different location in the engine from that shown in previous figures. The cam channel 2117 which functions as the cam channel in the previous discussed engines is located in the rotor near the perimeter boundary surface of the rotor across the annular cavity from the partitions 2301 pivot point, i.e. at the partitions greatest radii from their pivot points.

Figure 21:
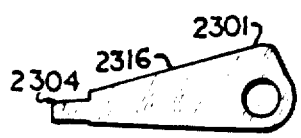
FIG. 21 is a partition used in the engine portrayed in FIG. 20.

FIG. 21 is a portrayal of the partition used by the engine of FIG. 20. It has extension 2304 which in FIG. 20 extends into rotor cam channel 2117 and edge surface 2316 which extends into the annular cavity and forms with the rotor wave surface towards which it extends a channel between the volume varying chambers on either side.

FIGS. 22 through 28 illustrate an engine similar to the engine in FIG. 1 but wherein the cam surface 118 of the rotor cam channel 117 and the edge surface 314 of each partition extension 304 it would engage through hydrodynamic interaction are operatively replaced. For each partition in the engine there are mechanical means such as a spring or hydraulic pressure acting on a piston abutting the partition. Said mechanical means coact with the operative engagement between the remaining rotor cam surface and the partitions to displace the partitions in their slots. Also illustrated is another method of supplying lubricant to the rotor cam channel.

FIG. 22 is a side break away section portrayal of an engine without a rotor cam surface 4118 and the edge surface 4314 on each of the partition extensions 4304. These elements are replaced operatively in the engine by a mechanical loading means combination at each partition. The mechanical loading means includes a compressed spring 4317 in channel 4217 interacting through a piston 4318, also in channel 4217, with the back edge of the partition 4301 in the partition assembly 4300. In the engine each channel 4217 is common to both casing section 4200 and partition assembly 4300 and extends far enough into the partitions slot 4305 for continuous engagement by the spring loaded piston 4318 with the partition throughout its pivotal motion therein. The spring pressure applied via the piston 4318 to the partition is adjustable by set screw 4218 in the threaded portion of the channel 4217. The set screw also retains the spring and piston combination in the channel 4217. The circuit for the supply of lubricant to the rotor cam channel includes a metering skirt whose four sections 4500 mount to form a continuous element on the inner circumference surface of the rotor cam channel 4117. The metering skirt is supplied lubricant via communicating channels 4121 in the rotor which are supplied by the casing channels 4216 which in turn are supplied by the lubricant supply channel 4402 of the lubricant manifold 4400. The lubricant manifold 4400 supplies each of the lubricant circuits to the rotor cam channel 4117 in the engine.

FIG. 23 a section break away view of the fluid manifold end of the engine in FIG. 22. Shown are set screws 4218 in the threaded end of channel 4217, the fluid manifold 4400 retained to the casing section 4200 by retainers 4406, the outlet channel 4403 to manifold sump channel 4401 and the supply channel 4404 to manifold lubricant supply channel 4402.

FIG. 24 is an outer circumferential view of one of the four metering skirt sections 4500 which are mounted at the inner circumference surface of the cam channel 4117. Shown are the openings 4504 used in retaining the skirt section in the cam channel and the metering channels 4502 which, in the engine, are adjacent to the inner most portion of cam surface 4119 of the rotor cam channel and therewith form radial extending, longitudinally closed, open ended channels 4502 which supply lubricant to the rotor cam surface 4119.

FIG. 25 is a cam surface side view of the metering skirt section 4500 of FIG. 24. Shown is the relief channel 4503 behind the skirt for which the inner circumferential surface of the rotor cam channel 4117 is also the inner circumferential surface. Channel 4503 supplies lubricant to the individual metering channels 4502 supplying the cam surface 4119.

FIG. 26 is an inner circumferential surface view of the metering skirt 4500 in FIGS. 24 and 25.

FIG. 27 is a representational section break away view of the lubricant supply circuit to the rotor cam channel 4117 with casing section 4200 removed along with the partition assembly 4300 except for a portion of the partition extension 4304 in the rotor cam channel. Shown in profile is the relief channel 4503 which is supplied lubricant by rotor channels 4121 and which in turn supplies lubricant to the multitude of metering channels 4502 supplying cam surface 4119. The metering skirt metering channels 4502 may be various in size and orientation to suit the particular requirements at the part of the cam surface it supplies.

FIG. 28 is a partition 4301 used in the engine portrayed in FIG. 22.

FIGS. 29 through FIG. 31 illustrate an engine similar to the engine in FIG. 1 where the partition elements are displaced in their slot through operative engagement by the two cam surfaces of the rotor cam channel. In this engine the lubricant is supplied to both cam surfaces of the cam channel by a metering skirt arrangement similar to that illustrated in FIG. 22 rather then by partition assembly lubricant spray extensions. Also shown in FIG. 31 but not essential to the engine operation with the partitions operatively engaged for their movement by the two rotor cam surfaces shown, is a mechanical loading means acting on the partitions much as in FIG. 22 but where the spring and set screw are replaced by fluid under pressure supplied from outside the engine acting on the piston. The combination can be used as in FIG. 22 wherein the mechanical loading means to the partition coact with only one cam surface of the rotor to effect partition pivotal movement in its slot.

FIG. 29 is an enlarged view of the outer circumference of a section 5500 of the metering skirt used in the engine portrayed in FIG. 31. It shows the skirt portion of some of the metering channels 5501 on one side and channels 5502 on the other. In the engine the skirt portions of channels 5501 and 5502 abut the inner most portion of cam surfaces 5118 and 5119 respectively forming therewith longitudinally closed channels 5501 and 5502 to supply lubricant to the cam surfaces 5118 and 5119 respectively.

FIG. 30 is a portrayal of the rotor cam channel of an engine similar to FIG. 27 but wherein the partitions 5301, like those in the engine in FIG. 1, are pivotally displaced solely by the rotor cam surfaces 5118 and 5119. The lubricant channeling 5121 of the rotor 5100 via the relief channel 5503 of metering skirt 5500 supplies lubricants to the metering channels 5501 and 5502 of the metering skirt which service the rotor cam surfaces 5118 and 5119 respectively.

FIG. 31 is a side section break away view of an engine similar to that in FIG. 1 but wherein lubricants are supplied to the cam channel via a metering skirt comprised of sections 5500 portrayed in FIG. 30. Although not required in the engine, there is also shown in the figure an additional portrayal of a mechanical loading means to coact with one rotor cam to displace the partitions in their slots pivotally. Shown is a loading means arrangement similar to FIG. 22 but wherein instead of a compressed spring as a mechanical loading means there is fluid 5319 under pressure supplied to channel 5217 to act on partition 5301 in its slot 5305 through the intermediate piston element 5318. The threaded hydraulic fixture 5218 supplies under pressure the fluid of channel 5217 from outside the engine.

FIGS. 32 through 34 illustrate an engine similar to the one in FIG. 1 but where the complex pumping and timing mechanisms of the fuel injector means for the proper supply of fuel to the engine and each volume varying chamber therein and the fuel injection means nozzle at each volume varying chamber are replaced by fuel injection means located in the rotor. With the fuel injection means located in the rotor there is a least one nozzle portion thereof for the injection of fuel into the volume varying chambers and it is located in the rotor at the beginning of the combustion region of the annular cavity. Fuel pressure to the nozzle of the injector means may be supplied completely or in part by the rotor rotation as discussed previously.

FIG. 32 is a side view of the engine with the casing and the rotor cut away to illustrate the path of the fuel supplied from the outside the engine to the fuel injector means in the rotor. The rotor fuel injector means element 6126 is feed fuel under pressure developed by rotor 6100 rotation. In the engine fuel is supplied to the injector element 6126 via the fuel channel 6122 of rotor power take-off shaft 6102 which is supplied with fuel from a source outside the engine and communicates with rotor fuel channel 6123 in the body of the rotor. Channel 6123 in turn communicates with fuel channel 6124 formed in the rotor between the rotor and the rotor porting plate 6108, and channel 6124 communicates with channel 6125 which in turn supplies injector means element 6126.

FIG. 33 is a wave surface end view of rotor 6100 of the engine. It shows the fuel intake channel 6122 at the end of the rotor shaft 6102 and the fuel injector element 6126 at the rotor wave surface 6107. In the engine, injector element 6126 opens to the annular cavity at the beginning of the combustion region.

FIG. 34 is a break away, porting plate end view of the rotor 6100. The porting plate 6108 is cut away to show the communication between the fuel supply channels, 6123, 6124 and 6125 behind the porting plate.

FIGS. 35 through 46 illustrate a four cycle engine with fuel injection means similar to the engine in FIG. 32 but having a different annular cavity profile, and different partitions, and partition assembles. Also the rotor intake and exhaust apertures communicate directly with the environment outside the engine through an open web casing section. The engine has fuel injection means in the rotor and its partitions are are displaced in their slots by rotor cam means. Lubricants for the rotor cam means hydrodynamic interaction with the partitions is supplied by lubricant spray extensions of the partition assembles.

Figure 44:
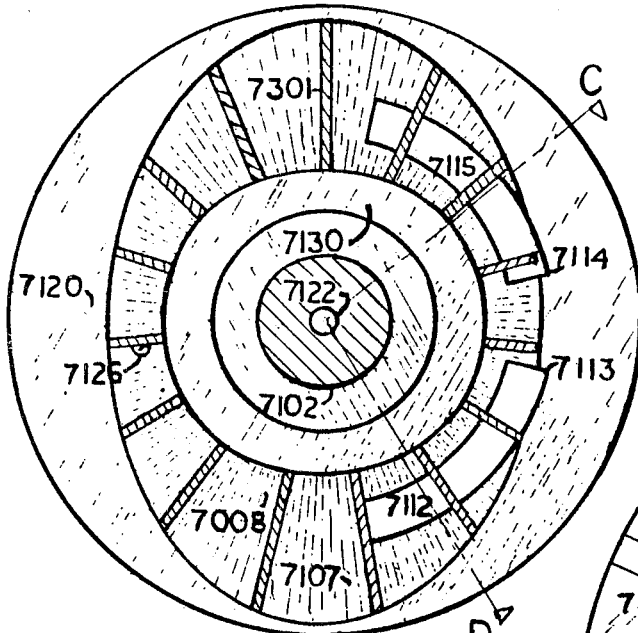
FIG. 44 is a section face surface end view of the annular cavity in FIG. 35.

FIG. 35 is a section break away view of the engine showing the open web portion 7000 of the casing which is retained to casing section 7200 by retainers 7215. The rotor 7100, in section taken with reference to lines C-D of FIG. 44, is mounted in the casing for journaled rotation. The casing section 7000 has opening 7001 through which rotor power take-off shaft 7101 extends and rotor power take-off shaft 7102 extends through opening 7201 in casing section 7200. The casing section 7200 is cut away to illustrate a mounted partition assembly 7300 in its retaining slot 7210. The lubricant supply channel to the partition assembly is 7202. Shown also is one of the engine's sump circuits comprised of the sump channel 7204, sump channel 7225, and sump exit port 7226. The rotor exhaust aperture 7112 extends between the annular cavity exhaust region and the volume varying chambers therein at its entry 7113 in the rotor wave surface 7107 and outside the engine. The rotor intake aperture 7115 extends between the annular cavity intake region and the volume varying chambers therein at its exit 7114 in the rotor wave surface, and outside the engine.

FIG. 36 is a side view of the engine's rotor 7100 with the rotor shaft 7101 broken away and the shaft 7102 cut off. Shown are the rotor intake aperture 7115 and the rotor exhaust aperture 7112 at the back of the rotor.

FIG. 37 is a rotor wave surface end view of the engine rotor 7100 showing the different shape of the rotor wave surface 7107 and outer perimeter boundary surface 7120 and inner perimeter boundary surface 7130 which are coplanar. Both perimeter boundary surfaces 7120 and 7130, of the rotor wave surface would in practice have seal means as in the previous portrayals of engine rotors. The seal means at the rotor wave surface perimeter boundary surfaces are deleted form this drawing and the following rotor portrayals, for clarity.

Figure 38:
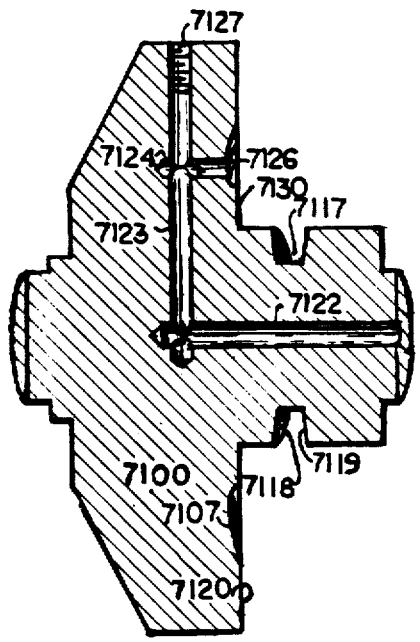
FIG. 38 is a section portrayal of the rotor in FIG. 37 taken with reference lines A-B of the figure.

FIG. 38 is a section side view of the rotor 7100 taken with reference to lines A–B of FIG. 37. Shown are the profile of the rotor wave surface 7107 and the circuit for supply of fuel from outside the engine to fuel injection element 7126 in the rotor at the wave surface. The fuel supply circuit is comprised of fuel channel 7122 of the rotor power shaft 7102 which communicates with rotor fuel channel 7123 which in turn communicates with rotor fuel channel 7124 which supplies the injector element 7126. Shown is screw plug 7127 of channel 7124.

Figure 39:
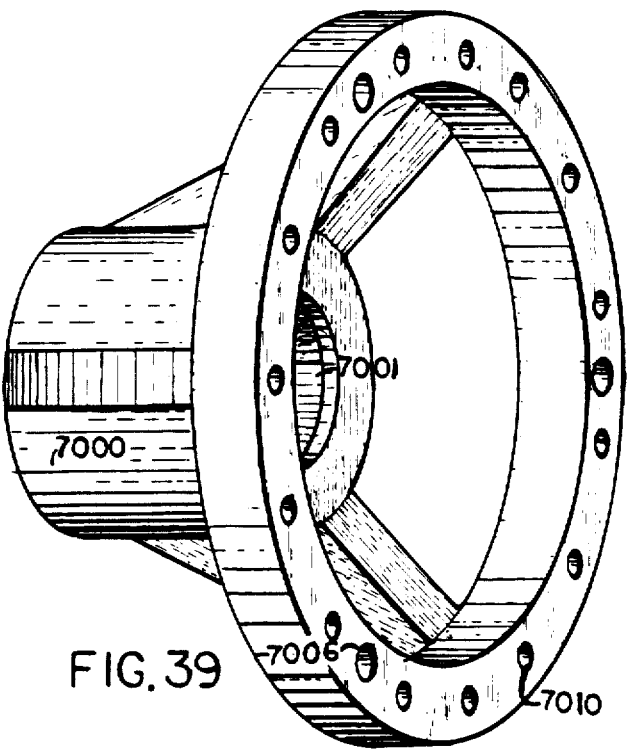
FIG. 39 is an oblique view of the open web portion of the casing of the engine in FIG. 35.

FIG. 39 is an oblique side view of the open web casing section 7000 of the engine.

FIGS. 40 through 43 show enlarged oblique side views of a partition assembly and its major elements used in the engine of FIG. 35.

Figure 40:
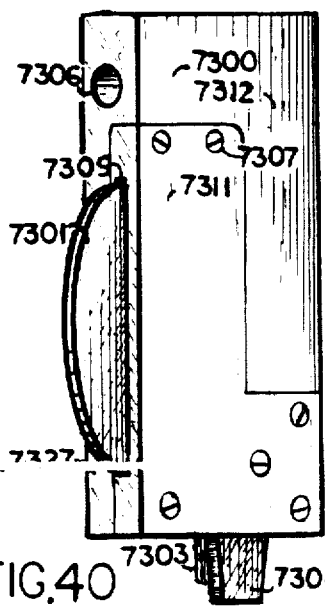
FIG. 40 is an enlarged oblique side view of a partition assembly of the engine in FIG. 35.

FIG. 40 shows the partition assembly 7300 with its major parts, the lubricant supply section 7312 and the partition retaining, or slot section 7311, retained together by fasteners 7307. The assembly has the partition 7301 mounted in its slot 7305 for pivotal, low friction motion therein. The partition is shown at near maximum extension form its slot 7305. Shown also are the partition extension 7304 and the spray extension 7303. Both extend into the rotor cam channel 7117 in the engine. Channel 7306 of the assembly aligns in the engine with casing section 7000 channels 7010 for retention there by an alignment pin. Surface 7327 is the extending surface on the partition assembly of face surface 7207 to the partition slot 7305 and in the engine is part of the face surface 7207. In the engine, partition slot 7305 is axially oriented and opens to the annular cavity across the face surface 7207 between the face surfaces' outer and inner perimeter boundary surfaces 7208 and 7209 respectively.

Figure 41:
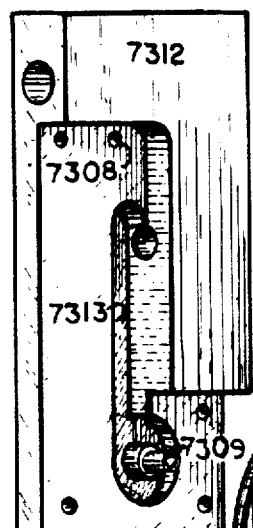
FIG. 41 is an enlarged oblique side view of the lubricant spray section of the partition assembly in FIG. 40.

FIG. 41 shows the lubricant spray portion of the assembly. Shown is lubricant channeling 7313 which communicates in the engine with the casing lubricant intake channel 7202 through which lubricant from outside the engine is supplied to the partition assemble. Lubricant channel 7313 communicates with the spray extension 7303 which in the engine extends into the rotor cam channel 7117 for projection, via the orifices 7322 in its walls, of lubricant therein. Shown also is the cylindrical extension 7309 that in the assembly extends into the slot 7305 of the slot section 7311 and is therein mounted for low friction pivotal movement by the partition 7301 with its bearing 7310.

Figure 42:
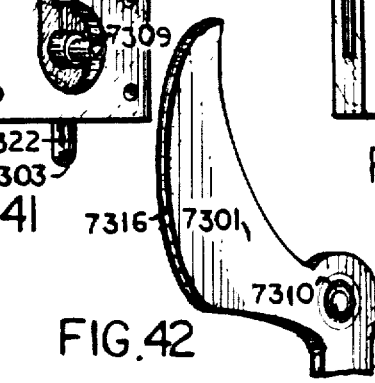
FIG. 42 is an enlarged oblique broken away view of the partition element used in the partition assembly in FIG. 40.
Figure 48:
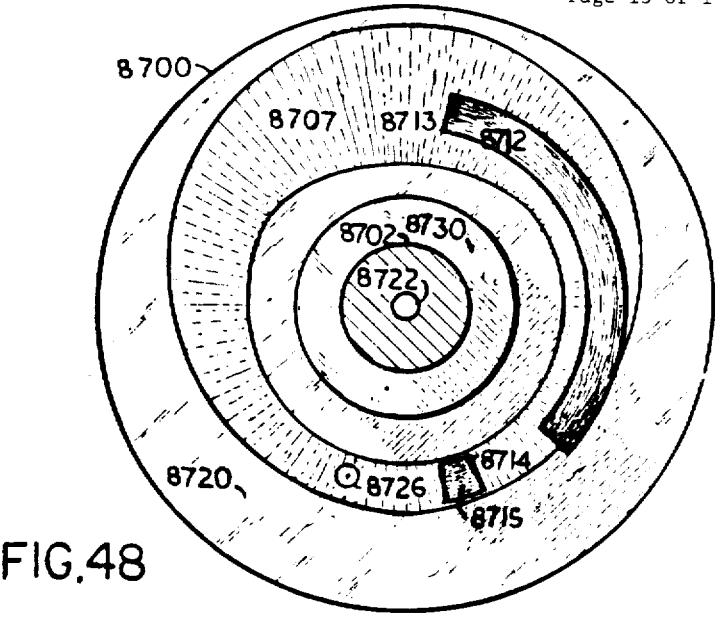
Figure 49:
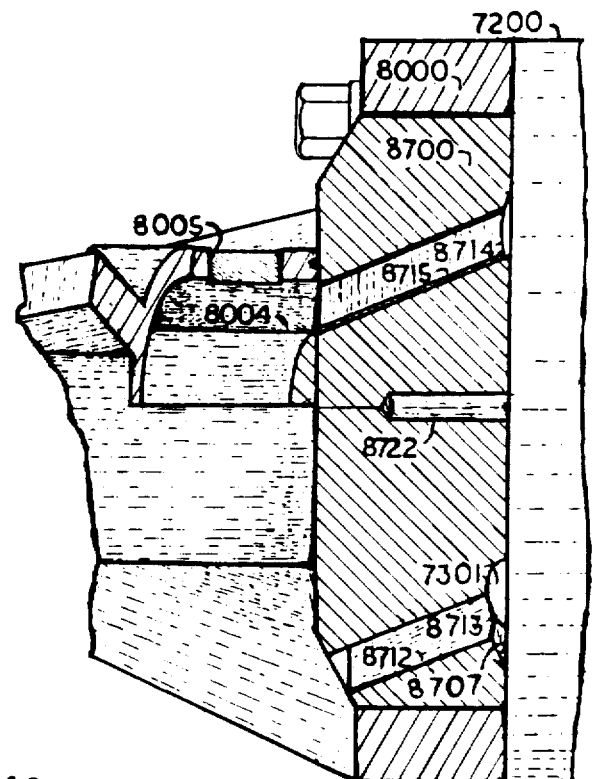
Figure 50:
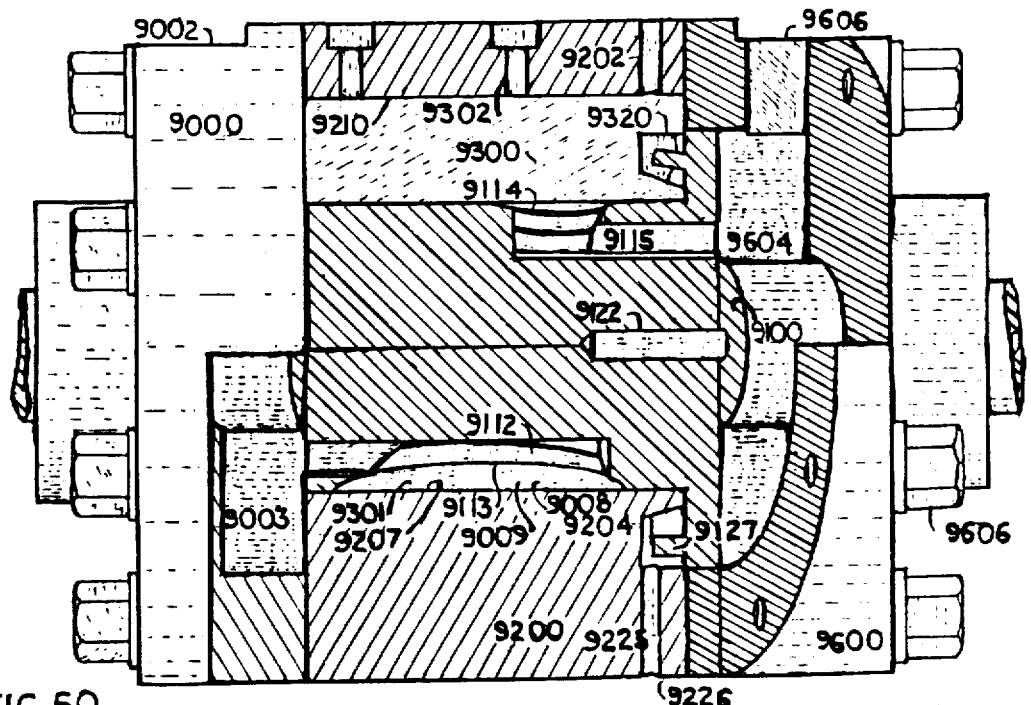
Figure 51:
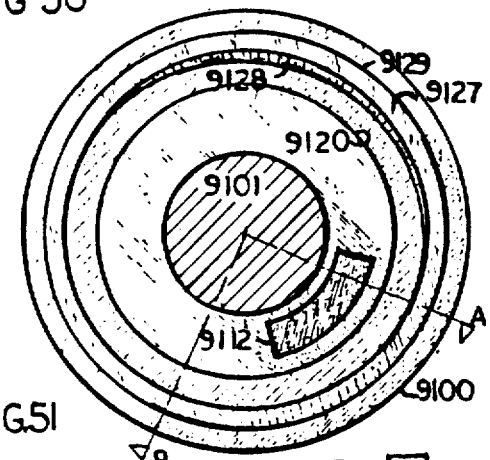
Figure 52:
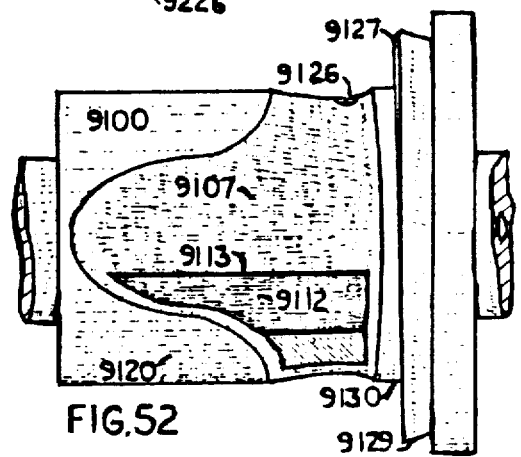
Figure 53:
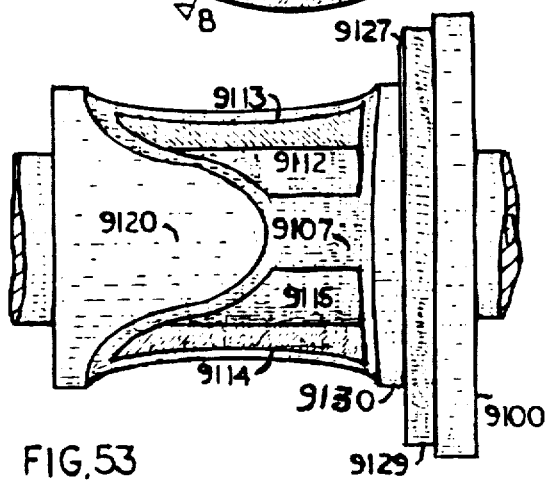
Figure 54:
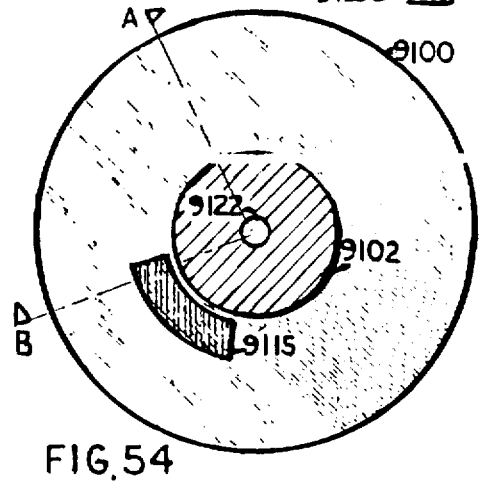

FIG. 42 shows the partition 7301 with its extension 7304 broken away and the low friction bearing 7310 in place around its pivot axis. Shown also is the partition edge surface 7316 which in the engine extends into the annular cavity.

Figure 43:
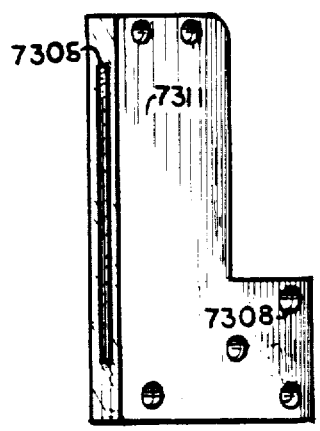
FIG. 43 is an enlarged oblique side view of the partition slot section of the partition as assembly in FIG. 40.

FIG. 43 shows the partition assembly's partition retaining slot section 7311.

FIG. 44 is a wave surface end view of the rotor 7100 with the partitions 7301 in the annular cavity cut at the casing face surface 7207. Shown are the plurality of volume varying chambers 7008 formed between consecutive partitions 7301 in the annular cavity, the volume varying chambers in the intake region of the annular cavity communicating with the exit 7114 in the rotor wave surface 7107 of the rotor intake aperture 7115, and the volume varying chambers in the exhaust region of the annular cavity communicating with the entry 7113 in the rotor wave surface of the rotor exhaust aperture 7112. Also shown are the fuel injector element 7126 in the rotor wave surface which in the engine opens to the annular cavity at the beginning of the combustion region and the volume varying chambers there. Also illustrated are the inner perimeter boundary surface 7130 and the outer perimeter boundary surface 7120 to the rotor wave surface and their variation about the rotor axis, and the cut off rotor shaft 7102 with rotor shaft fuel supply channel 7122.

Figure 45:
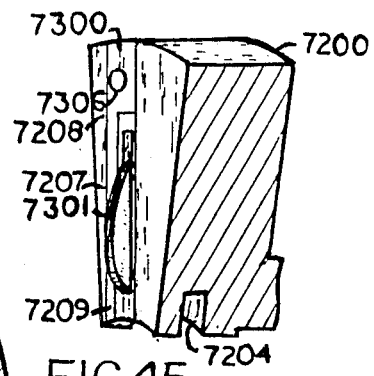
FIG. 45 is an oblique, broken away, section view of the face surface section of the casing in FIG. 35.

FIG. 45 is a section, oblique break-away portrayal of the casing section 7200 with a partition assembly 7300 retained therein and from which the partition 7301 in its slot 7305 extends as it would into the annular cavity in the engine.

Figure 46:
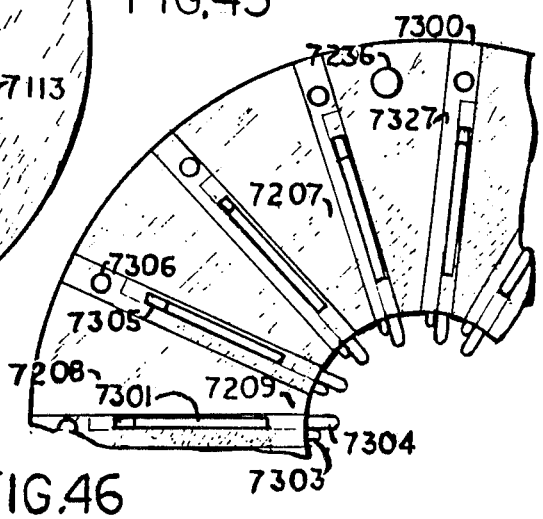
FIG. 46 is broken away view of the face surface in FIG. 35.

FIG. 46 is a face surface end view of casing section 7200 which is broken away. Shown are the circumferential spaced partition assembles 7300 mounted in their respective casing slots 7210, the partitions extending from their slots 7305 in the assembles and the face surface 7207, and both the partition extensions 7304 and the lubricant spray extensions 7303 which in the engine extend into the rotor cam channel 7117.

Figure 47:
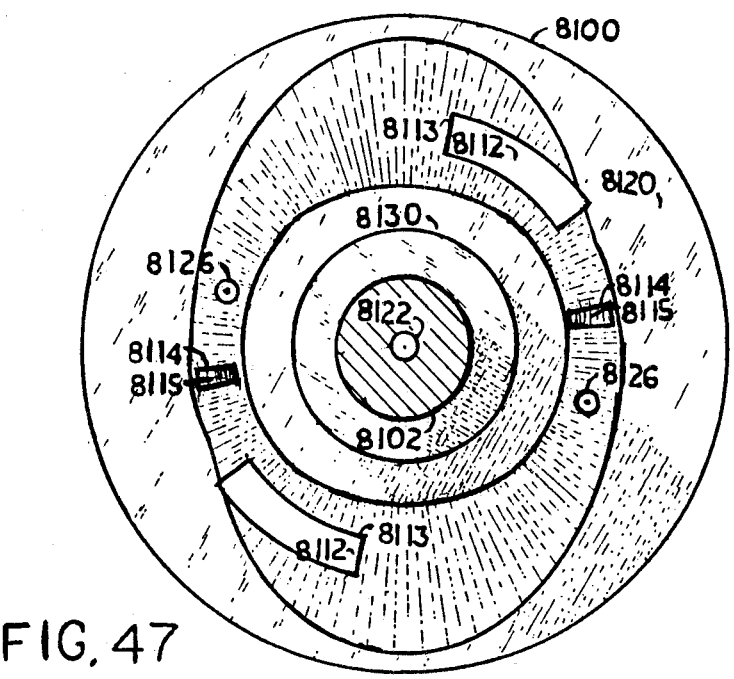
FIG. 47 is a wave surface end view of a two combustion station two cycle rotor which may be used with the face surface, casing section and partition assembles in FIG. 35.
Figure 48:
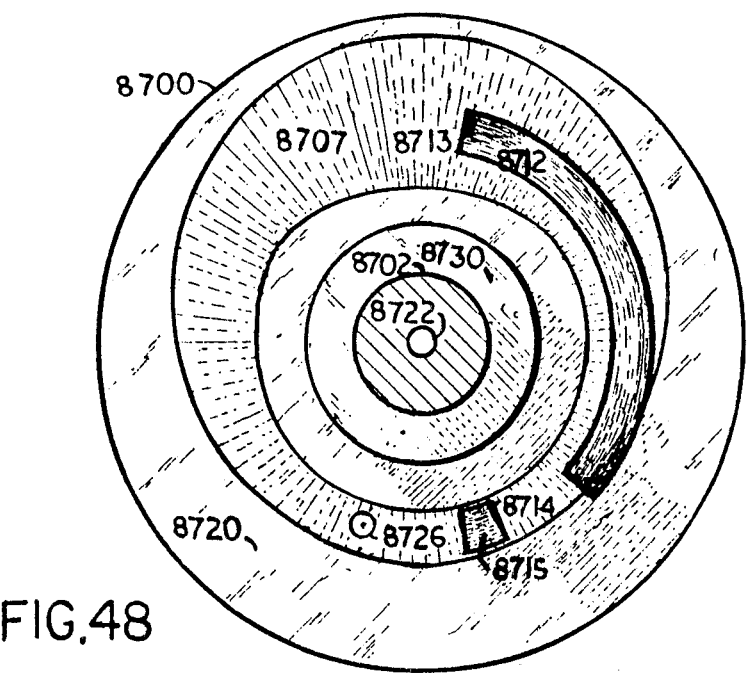
FIG. 48 is a wave surface end view of a one combustion station two cycle rotor for use as the rotor in FIG. 47.
Figure 49:
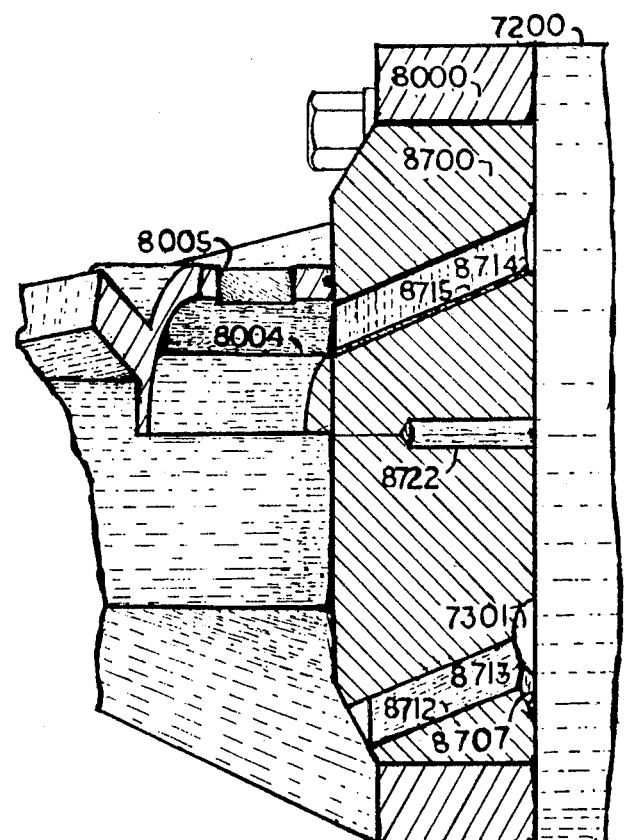
FIG. 49 is a side cut away section view of the rotor and open web casing section of an engine as in FIG. 35 but for two cycle power generation.

FIGS. 47 and 48 portray engine rotor elements that may be used with casing section 7200 and the partition assembles 7300 of the engine in FIG. 35 along with the casing section 8000 portrayed in FIG. 49 to form an engine with two cycle power generation.

FIG. 47 shows rotor 8100 with its wave surface 8107 having two combustion stations (two undulations). Each combustion station has at it and opening to the annular cavity; a rotor high pressure inlet aperture 8115 with entry 8114 in the rotor wave surface at the beginning of the combustion region, a rotor fuel injector nozzle element 8126 in the rotor wave surface also at the beginning of the combustion region and a rotor the exhaustt aperture 8112 with entry 8113 in the wave surface in the exhaust region of the station.

FIG. 48 shows rotor 8700 which has one combustion station. Shown in the rotor wave surface 8707 is exit 8714 of the high pressure inlet aperture 8715, rotor fuel injection nozzle element 8726 and entry 8713 of exhaust aperture 8712.

FIG. 49 is a broken away section portrayal of a two cycle engine with one station that uses rotor 8700 which is mounted for journaled rotation in the engine casing comprised of open web section 8000 and the casing section 7200 with partition assembles 7300 of the engine in FIG. 35. Shown are the exhaust aperture 8712 of the rotor extending between its entry 8713 in the wave surface 8707 of the annular cavity and outside the engine, and the high pressure inlet aperture 8715 which extends from its exit 8714 in the rotor wave surface to the high pressure channel 8004 in the casing section 8000 which is supplied via port 8005 with substances under high pressure from a source outside the engine.

The rotor 8100 of FIG. 47 with two combustion stations can substitute for rotor 8700 in the combination shown in FIG. 49 for two cycle mechanical power generation.

In engine operation the rotors shown for two cycle power generation, 8100 and 8700 rotate counter clockwise (rotor wave end view) and the volume varying chambers with rotor rotation traverse the combustion station in the annular cavity, which in rotor 8700 is the total annular cavity and in rotor 8100, with two stations, one half the annular cavity. Taking rotor 8700 as our topic rotor the volume varying chambers beginning the traverse of the station are each first, infused with substances under high pressure from outside the engine when in communication with the exit port 8714 in the rotor wave surface 8707 of the high pressure intake channel 8715. Then the volume varying chambers with further traverse pass over the fuel injection nozzle 8726 at the rotor wave surface, and are injected with fuel thereby. When combustion is yet to be initiated in the engine the fuel injected contents of the volume varying chambers in the engine may be ignited and combustion initiated in the combustion region of the annular cavity by methods and means already discussed in four cycle engine operation. As in the four cycle engines, with combustion established in the annular cavity combustion region, each newly fuel injected volume varying chamber is ignited by the high pressure flow of combustion involved mass into it from its neighbor preceding it into the combustion region through the gap formed between their common partition's edge surface in the annular cavity and the rotor wave surface toward which it extends. The high pressure generated by the combustion processes in the volume varying chambers while in the combustion region act on the rotor wave surface driving the rotor in rotation for mechanical power output. During the rotor rotation the volume varying chambers traversing the combustion region increase in volume until reaching a maximum volume in the combustion station, after which with further traverse, they are in the exhaust region of the annular cavity. With their traverse of the exhaust region the volume varying chambers decrease in volume and communicate with entry 8713 of the rotor exhaust aperture 8712 in the rotor wave surface and expel their products of combustion contents thereby to outside the engine. With further traverse of the annular cavity they arrive with a minimum volume at the end of the combustion station (and exhaust region) and no longer communicate with the entry in the wave surface of the rotor exhaust aperture, and begin again traverse of the combustion station and the two cycle power generation process. The sequence is the same for the two station rotor 8100 as above only each volume varying chamber undergoes two cycles of power generation per rotor revolution.

FIGS. 50 through 60 portray another four cycle engine and its elements. In the engine the casing face surface and the rotor wave surface forming the annular cavity have an orientation similar to the annular cavity of the engine portrayed in FIG. 18. The engine casing has a cylindrical cavity in which the cylindrical like rotor is mounted for journaled rotation. The inner cylindrical surface of the casing cavity is the annular cavity face surface from which the partitions extend from their slots with axial pivotal motion into the annular cavity. The partitions are mounted in partition assembles which are in turn mounted in the casing section with the face surface as in previous portrayed engines. The outer surface of the rotor includes the wave surface and is otherwise generally cylindrical. The annular cavity is formed between the rotor's wave surface (part of its outer surface), and the casing face surface which is in the casing cavity's inner cylindrical surface across from the rotor wave surface. The illustrated engine has fuel injection means located in the rotor, and its partitions' pivotal extension into the annular cavity is effected by a rotor cam means in the form of a continuous rail on the rotor, the rotor cam rail, which is circumferential to the rotor axis. The rotor cam rail has side surfaces, the rotor cam surfaces, which change special orientation about the rotor axis. The rotor cam surfaces operatively engage through hydrodynamic interaction the partitions during their traverse of the annular cavity with the rotor rotation, and thereby maintain the partitions edge surfaces in the annular cavity extending towards the rotor wave surface without abutting it and in close proximity to the rotor wave surface at least in the combustion and compression regions of the of the annular cavity. Lubricants are supplied to the cam rail surfaces by spay orifices in the partition assembles. In the engine shown the casing has two end caps through which the rotor power take-off shafts extend. The end caps are used to control and direct the intake and exhaust substances of the engine and they also contain the journal means between the rotor and casing.

Figure 50:
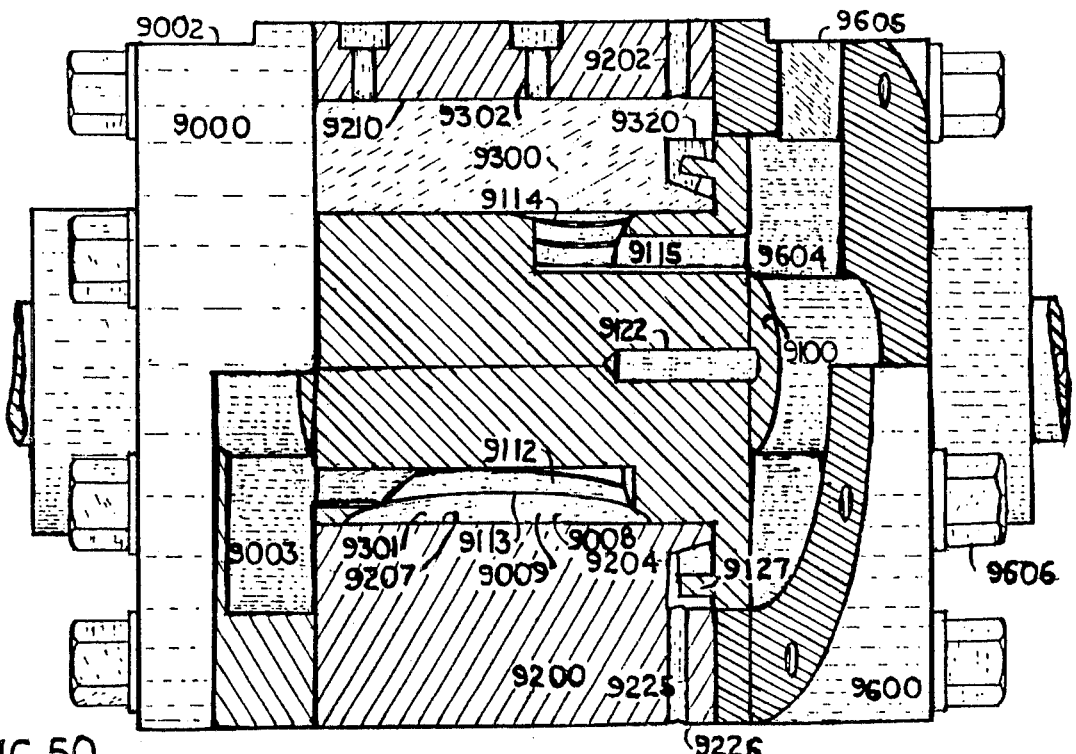
FIG. 50 is a portrayal similar to FIG. 1 of another embodiment of the engine invention, similar to FIG. 18 and taken with reference to the lines A-B of FIGS. 51 and 52.
Figure 51:
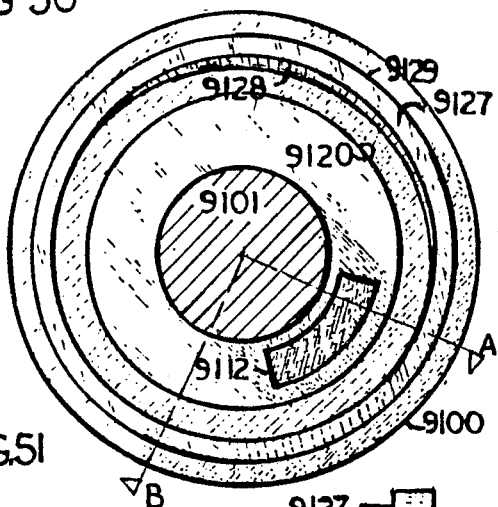
FIG. 51 is an end view of the rotor of FIG. 50 looking towards the rotor cam rail.
Figure 54:
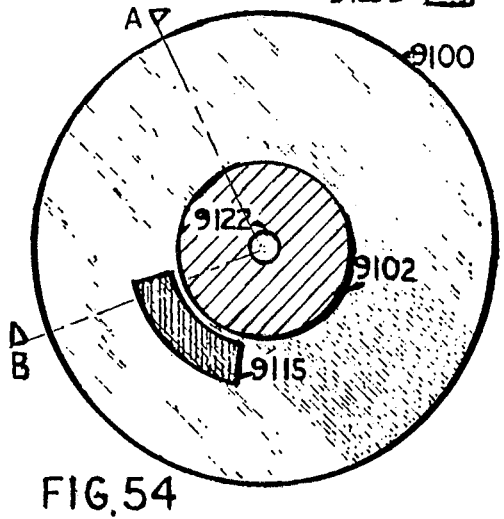
FIG. 54 is a right end view of the rotor in FIG. 53.
Figure 9:
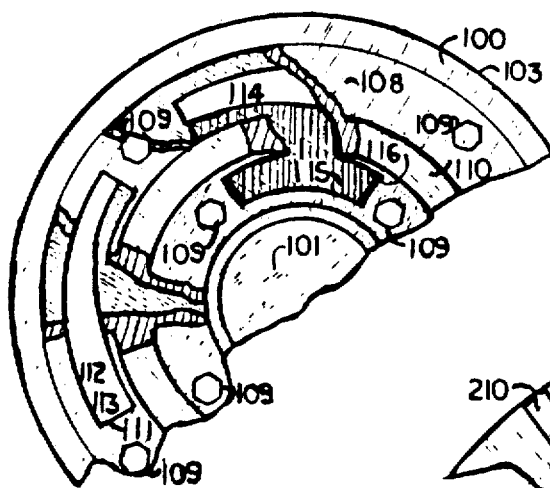
Figure 10:
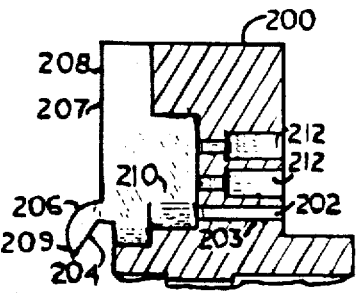
Figure 11:
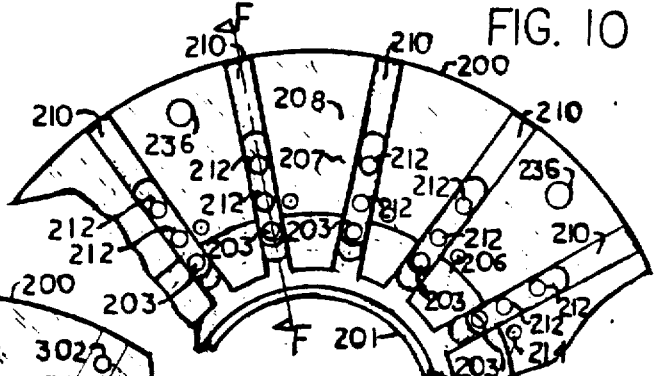
Figure 12:
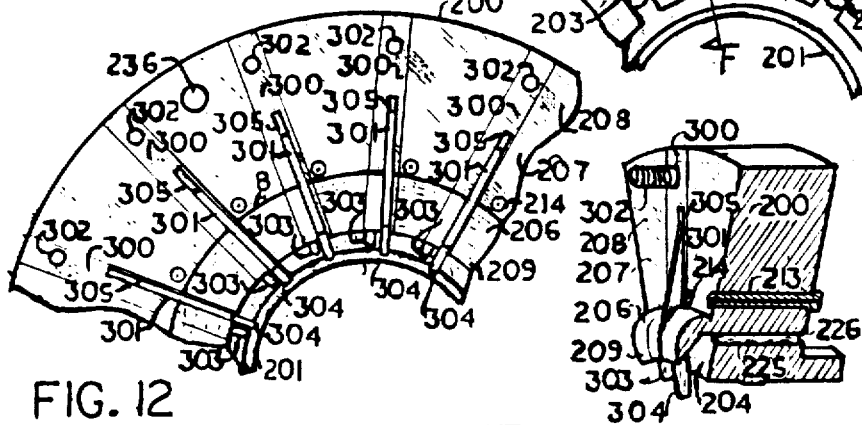
Figure 13:
Figure 14:
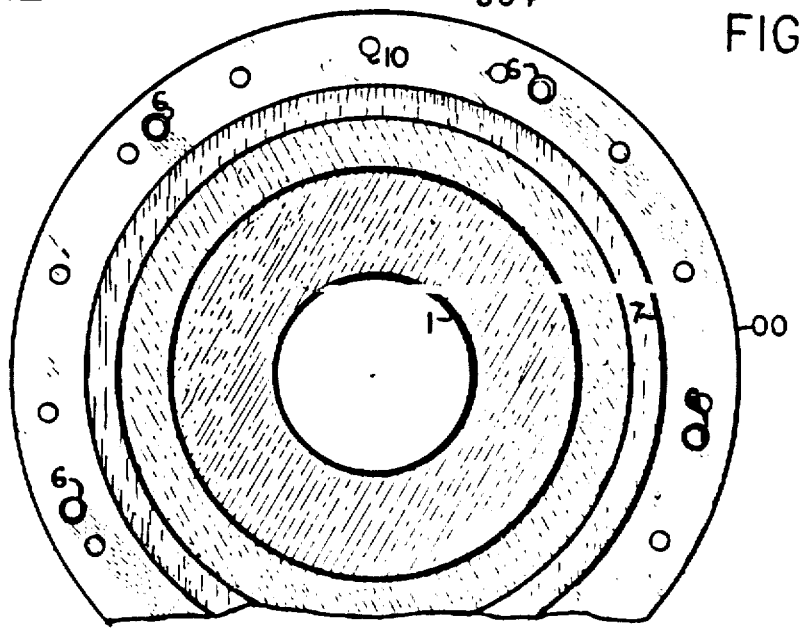

FIG. 50 is a side section view of the engine with the rotor power take-off shafts broken away and the rotor cut with reference to lines A–B of FIGS. 51 and 54.

Shown is cylindrical casing section 9200 with axially oriented circumferential spaced slots 9210 in its wall for retaining by fasteners 9302 partition assembles 9300. The engine casing also has exhaust end cap 9000 and intake end cap 9600 sections. In the engine these casing sections with the rotor 9100 within, are retained together by fasteners 9606. The rotor element 9100 is mounted for journaled rotation in the casing cylinder, and has the undulating wave surface 9107 as part of its outer surface which is otherwise cylindrical. The portion of the inner cylindrical surface of casing section 9200 across form the rotor wave surface 9107 is the face surface 9207. Between the face surface 9207 and the rotor wave surface 9107 is the annular cavity 9009 of the engine. The cylindrical surface 9130 is the perimeter boundary surface at the perimeter of the wave surface 9107 nearest the rotor cam rail and the portion of the casing section 9200 inner cylindrical surface to which it mates is perimeter boundary surface 9209. The other perimeter boundary surface of the rotor wave surface is cylindrical surface 9120 and the casing surface it mates is perimeter boundary surface 9208. Shown in the figure are the partitions 9301 extending into the annular cavity 9009 and the volume varying chambers 9008 formed between consecutive partitions therein. The rotor cam means is the rotor cam rail 9127 which operatively engages the partitions 9301 in their assembles 9300 within the open channels 9320 at the rotor cam rail end of said assembles. Lubricant is supplied to the rotor cam rail via lubricant inlet channels 9202 in the casing which communicate with the lubricant channels in the partition assembles which complete the lubricant inlet circuit. Lubricant is removed from the engine via sump channels 9204 and 9225 which has casing exit port 9226. The circuit for the intake of substances by the volume varying chambers in the intake region of the annular cavity from outside the engine is: the intake port 9605 which communicates with intake channel 9604, both in casing intake cap 9600; intake channel 9604 communicates with intake aperture 9115 of the rotor; and inlet aperture 9115 has exit 9114 in rotor wave surface 9107 at the intake region of the annular cavity which communicates with the volume varying chambers therein. The circuit for the expulsion of the products of combustion from the volume varying chambers in the exhaust region of the engine's annular cavity is: via the entry 9113 in the rotor wave surface in the exhaust region, to the rotor exhaust aperture 9112; and the rotor exhaust aperture 9112 communicates with the exhaust channel 9003 of exhaust end cap 9000 which has exhaust port 9002 to outside the engine.

FIG. 51 is an exhaust end cap end view of the rotor element 9100 with section of the rotor shaft 9101.

Shown is the rotor cam rail 9127 with inner and outer undulating circumferential surfaces 9128 and 9129 respectively, which operatively engage the partitions for their pivotal movement. Shown is the rotor perimeter boundary surface 9120 in profile and the rotor exhaust aperture 9112 where it exits the rotor to the end cap exhaust channel 9003.

Figure 52:
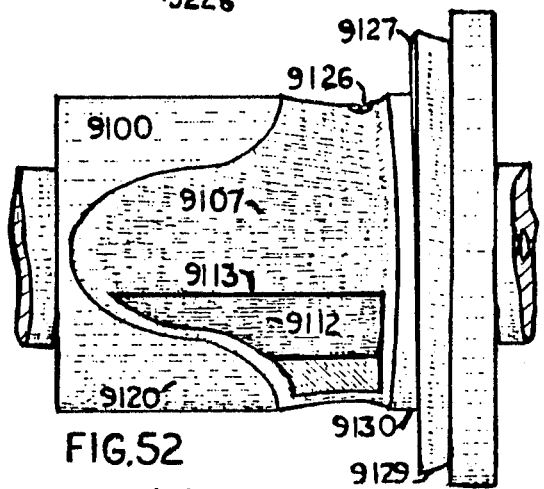
FIG. 52 is a right side view of the rotor in FIG. 51.

FIG. 52 is a right side view of rotor 9100 in FIG. 51 with the rotor power output shafts broken away. Shown are the undulating wave surface 9107 of the rotor with its cylindrical perimeter boundary surfaces 9120 and 9130, the fuel injection means 9126 in the wave surface, a side view of the rotor cam means, cam rail 9127, and the rotor wave surface exit 9113 of the exhaust aperture 9112 which is at the exhaust region of the annular cavity in the engine.

Figure 53:
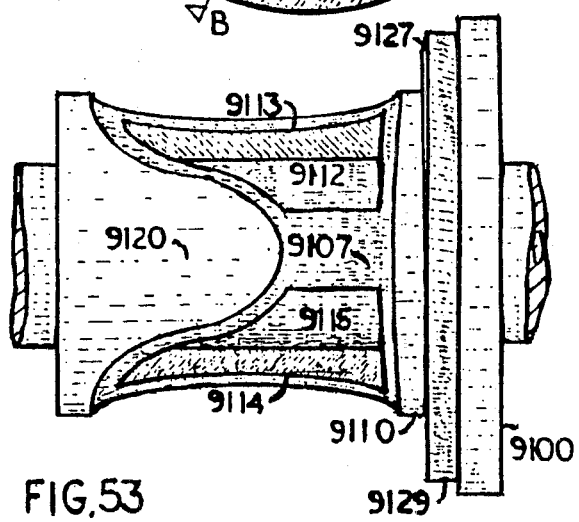
FIG. 53 is a side view of the rotor in FIG. 52 rotated about one quarter turn.

FIG. 53 is a bottom view of FIG. 51. Shown is the exhaust aperture 9112 of the rotor with inlet 9113 in the rotor wave surface 9107 at the exhaust region of the annular cavity when in the engine. In the drawing the exhaust aperture 9112 exits the left end of the rotor. Also shown is intake aperture 9115 with exit 9114 in the rotor wave surface at the intake region of the annular cavity when in the engine. In the drawing the intake aperture 9115 exits out the right side of the rotor.

FIG. 54 is a right side end view of the rotor in FIG. 53. Shown is the entry of the rotor intake aperture 9115 which is at the intake end cap channel 9604 in the engine.

FIG. 55 is a broken away view of the sump channel end of the casing section 9200. Shown are the sump channel 9204 which in this engine is also the open channel in which the rotor cam rail 9127 travels in rotation. Shown are the circumferential spaced partition assembly mounting slots 9210 which in the engine retain the partition assembles 9300 from which the partitions 9301 extend with pivotal axial motion from their slots 9305 and from the casing face surface 9207 into the annular cavity. Shown is one partition assembly 9300 retained in its casing slot 9210 with its partition 9301 extending axially from the casing face surface 9207 as in the engine it would extend with its edge surface 9316 into the annular cavity 9009 towards the rotor wave surface 9107 without abutting it and for close proximity therewith in the annular cavity compression and combustion regions. The partition edge surface and the rotor wave surface towards which it extends forms the gap through which mass is allowed to flow between the volume varying chambers 9008 on either side of the partition. The portion of the partition 9301 in the partition assembly open channel 9320 has a notch 9321 through which the rotor cam rail 9127 travels with operative engagement.

FIG. 56 is a broken-away section view of the casing section 9200 taken with reference to line C—C of FIG. 55.

FIG. 57 is an enlarged oblique view of the partition assembly 9300 of the engine. Shown are its major parts, the lubricant spray section 9312 and the partition slot section 9311 with partition 9301 in place and at maximum pivotal displacement in its slot 9305 from the partition assembles face surface part, surface 9327. The assembly is retained together by screws 9307. Shown is the rotor cam rail channel 9320 (also called the open channel) of the assembly with notch 9321 of the partition portion therein for the rotor cam rail.

FIG. 58 is an enlarged side oblique view of the partition assembly 9300 lubricant spray section 9312 showing the lubricant channels 9313 which communicate between the casing lubricant channel 9202, which supplies lubricant to the assembly from outside the engine, and the lubricant spray orifices 9322 through the walls of the rotor cam channel 9320 of the assembly which supply lubricant to the cam surfaces 9128 and 9129 of the rotor cam rail 9127. Also shown is cylindrical extension 9309 on which partition 9301 with low friction bearing 9310 mounts in the assembly for low friction pivotal motion.

FIG. 59 is an enlarged side oblique view of the partition slot section 9311 of the partition assembly 9300.

FIG. 60 is an enlarged side oblique view of the partition 9301. Shown is the notch 9321 through which the rotor cam rail 9127 travels with rotor rotation in the engine. In the engine edge surface 9323 of notch 9321 is hydrodynamically engaged by the cam surface 9128 of the rotor cam rail 9127, and notch edge surface 9324 which is engaged in like manner by the rotor cam rail cam surface 9129. Shown also are the partition edge surface 9316 which in the engine extends towards the rotor wave surface in the annular cavity without abutting it and is in close proximity of the rotor wave surface at least in the combustion and compression regions therein. Also shown is the low friction bearing 9310 with which the partition, in the assembly, mounts cylindrical extension 9309 in its slot 9305.

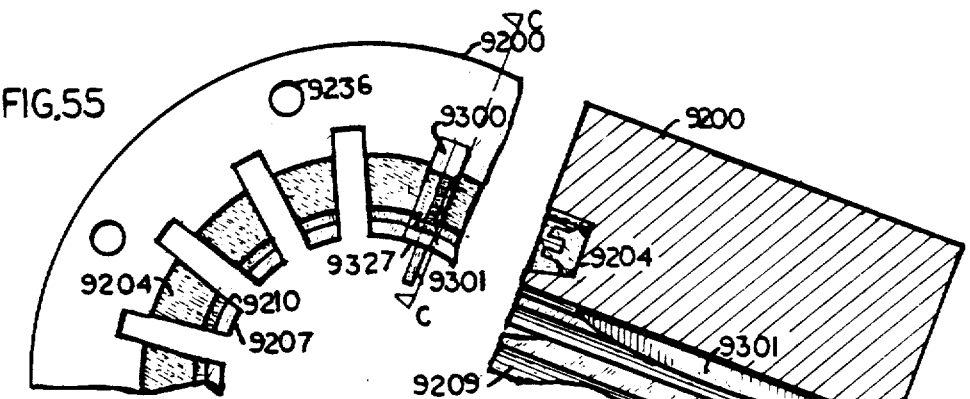
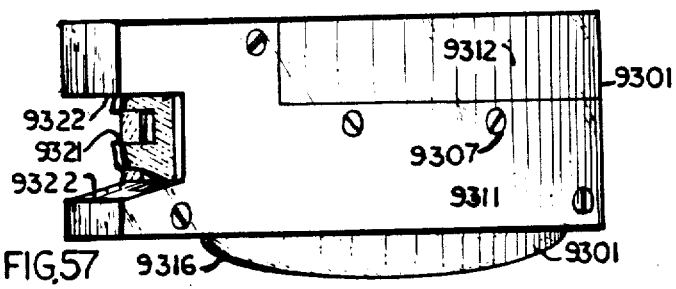
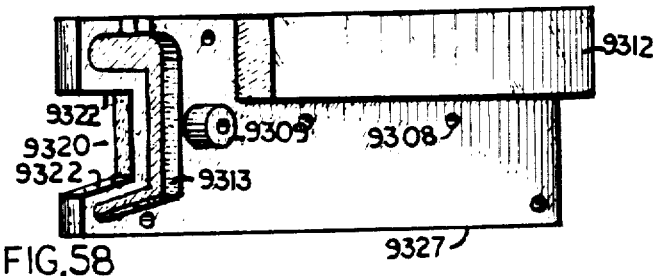
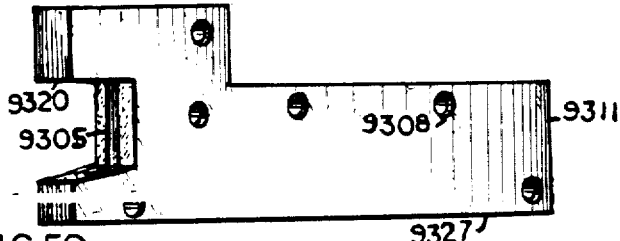
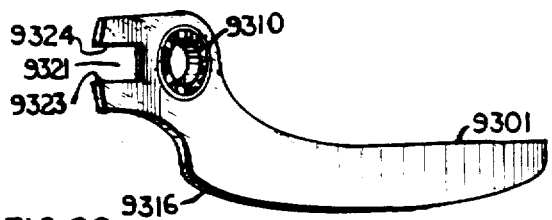

What I claim is:

1. A rotary internal combustion engine having:
  a casing;
  a rotor mounted for rotation in the casing with at least one power take off means to outside the engine;
  an annular cavity formed between the casing and the rotor about the rotor axis;
  a wave surface on the rotor about the rotor axis which is a boundary surface of the annular cavity and which has one circumferential undulation;
  a face surface on the casing about the rotor axis which is a boundary surface of the annular cavity and across the annular cavity from the rotor wave surface and facing it;
  a combustion station in the annular cavity at the undulation in the rotor wave surface;
  the casing with a plurality of slots, which are axially oriented and circumferentially spaced about the rotor axis and open to the annular cavity across the face surface in the direction from one perimeter boundary surface to the other perimeter boundary surface;
  a partition mounted in each of the casing slots for pivotal, axially directed motion therein and extension therefrom into the annular cavity;
  a cam means on the rotor which is circumferential to the rotor axis and outside of the annular cavity;
  a portion of each partition operatively engaged by the rotor cam means for its pivotal position in its slot and extension therefrom into the annular cavity;
  a plurality of circumferentially spaced volume varying chambers formed in the annular cavity by the partitions with a volume varying chamber formed between consecutive partitions in the annular cavity;
  a cyclic volume variation between minimum and maximum volume in each volume varying chamber with rotation of the rotor in the casing and the consequent traverse of the annular cavity station by the volume varying chambers;

a combustion region in the combustion station wherein with its traverse by the volume varying chambers in it, said chambers increase in volume;

an exhaust region in the combustion station wherein with its traverse by the volume varying chambers in it, said chambers decrease in volume;

the partitions edge surfaces in the annular cavity extending towards the annular cavity surfaces without abutting the annular cavity surfaces towards which they extend and maintained in close proximity to the annular cavity surfaces towards which they extend at least in the combustion region of the combustion station;

combustion processes occurring in the volume varying chambers in the combustion region of the annular cavity;

intake means for the transfer of noncombustible combustion supporting substances from outside the engine to the volume varying chambers for their combustion processes in the annular cavity combustion region;

exhaust means for the transfer of the products of combustion contents of the volume varying chambers to outside the engine;

fuel injection means to introduce combustibles into volume varying chambers for their combustion processes in the combustion region of the combustion station;

the combustion processes in the volume varying chambers in the combustion region of the annular cavity drive the rotor in rotation for mechanical power output.

2. A combination as in claim 1 wherein:

the rotor wave surface has another undulation which is adjacent a undulation with a combustion station in the annular cavity and where in the annular cavity there is a compression station;

the volume varying chambers traversing the compression station first traverse an annular cavity intake region at the compression station and therein increase in volume;

intake means to the volume varying chambers are at the compression station of the annular cavity;

the annular cavity has a compression region at the compression station wherein traversing volume varying chambers decrease in volume and the noncombustible combustion supporting substances in said chambers are compressed for the combustion processes in the adjacent combustion region;

the edge surfaces of the partitions in the compression region of the annular cavity are in close proximity to the annular cavity surfaces towards which they extend.

3. A combination as in claim 1 wherein said partition's pivotal position in its slot and extension therefrom into the annular cavity is by operative engagement with rotor cam means coacting with mechanical loading means acting between the partition and the casing.

4. A combination as in claim 2 wherein said partition's pivotal position in its slot and extension therefrom into the annular cavity is by operative engagement with rotor cam means coacting with mechanical loading means acting between the partition and the casing.

5. A combination as in claim 1 wherein fuel injector means are in the rotor.

6. A combination as in claim 2 wherein fuel injector means are in the rotor.

7. A combination as in claim 3 wherein fuel injector means are in the rotor.

8. A combination as in claim 4 wherein fuel injector means are in the rotor.

9. A combination as in claim 1, 2, 3, 4, 5, 6, 7 or 8, wherein intake means are in the rotor.

10. A combination as in claim 1, 3, 5 or 7 wherein the intake means is comprised of a high pressure inlet port in the casing, a high pressure inlet channel in the casing, a high pressure inlet aperture in the rotor extending between the casing high pressure inlet channel and the beginning of the combustion region in the annular cavity; the arrangement of the casing high pressure inlet port, the casing high pressure inlet channel and the rotor high pressure inlet aperture in a manner permitting the transfer of noncombustible combustion supporting substances to the volume varying chambers communicating with the rotor inlet aperture.

11. A combination as in claim 2, 4, 6 or 8, wherein intake means are in the rotor and comprised of a rotor intake aperture with exit in the annular cavity intake region.

12. A combination as in claim 1, 2, 3, 4, 5, 6, 7 or 8, wherein exhaust means are in the rotor.

13. A combination as in claim 12 wherein said exhaust means is comprised of a rotor exhaust aperture with entry in the annular cavity in the exhaust region.

* * * * *

UNITED STATES PATENT AND TRADEMARK OFFICE
CERTIFICATE OF CORRECTION

PATENT NO. : 4,653,446　　　　　　　　Page 1 of 15

DATED : March 31, 1987

INVENTOR(S) : Joseph F. Frasca

It is certified that error appears in the above-identified patent and that said Letters Patent is hereby corrected as shown below:

The title page showing the illustrative figure should be deleted to appear as per attached title page.

In the drawing, the seven (7) sheets of drawing should be deleted to be replaced with the twelve (12) sheets of drawing containing the sixty drawing figures as shown on the attached sheets.

Column 2, line 58, insert -- combustion -- before "station".

Column 3, line 39, "position" should read -- positive --.

Column 3, line 44, "increased" should read -- increase --.

Column 5, line 16, "35" should read -- 32 --.

Column 5, line 34, delete "as".

Column 5, line 53, "52" should read -- 54 --.

Column 7, line 24, "form" should read -- from --.

Column 10, line 24, "angular" should read -- annular --.

Column 10, line 43, "from" should read -- form --.

Column 13, line 45, "202" should read -- 203 --.

Column 15, line 18, delete "P" and beging new paragraph with "FIG. 17".

Column 15, line 27, before "partitions" insert -- the --.

Column 16, line 53, after "varying" insert -- chamber --

Column 21, line 23, "form" should read -- from --.

Column 22, line 30, "entry" should read -- exit --.

Column 23, line 65, "special" should read -- spatial --.

Column 24, line 5, delete "of the".

UNITED STATES PATENT AND TRADEMARK OFFICE
CERTIFICATE OF CORRECTION

PATENT NO. : 4,653,446

DATED : March 31, 1987

INVENTOR(S) : Joseph F. Frasca

It is certified that error appears in the above-identified patent and that said Letters Patent is hereby corrected as shown below:

Column 24, line 11, "substances" should read -- matter --.

Column 25, line 14, "exit" should read -- entry --.

Column 26, line 20, "are" should read -- is --.

This certificate supersedes Certificate of Correction issued July 7, 1987.

Signed and Sealed this

Eighth Day of September, 1987

Attest:

DONALD J. QUIGG

*Attesting Officer*   *Commissioner of Patents and Trademarks*

United States Patent
Frasca

[11] Patent Number: 4,653,446
[45] Date of Patent: Mar. 31, 1987

[54] ROTARY INTERNAL COMBUSTION ENGINE

[76] Inventor: Joseph F. Frasca, 5801 Yorktown Rd., Lorain, Ohio 44053

[21] Appl. No.: 690,888
[22] Filed: Jan. 14, 1985
[51] Int. Cl.⁴ .................................. F02B 53/00
[52] U.S. Cl. ............................ 123/244; 418/231; 418/233
[58] Field of Search .............. 123/244; 418/218, 228, 418/229, 230, 231, 232, 233

[56] References Cited

U.S. PATENT DOCUMENTS

| | | | |
|---|---|---|---|
| 782,359 | 2/1905 | Rathjens et al. | 418/218 |
| 2,436,285 | 2/1948 | Booth | 418/233 X |
| 3,762,844 | 10/1973 | Isaksen | 418/218 |
| 3,769,945 | 11/1973 | Kahre | 418/231 |
| 3,838,954 | 10/1974 | Rapous | 418/218 X |
| 4,137,890 | 2/1979 | Wohl | 418/232 X |

FOREIGN PATENT DOCUMENTS 143132 9/1982 Japan .................................. 123/244

Primary Examiner—Michael Koczo

[57] ABSTRACT

The invention is an internal combustion engine for two or four cycle mechanical power generation. The engine has an annular cavity formed between its rotor and casing and around the rotor rotational axis. The rotor surface at the annular cavity has undulation(s) and the casing surface at the annular cavity has a plurality of circumferentially spaced axial plane slots each with a partition pivotally extending into the annular cavity but not abutting the annular cavity walls and in the combustion region therein and when there is a compression region to very close proximity of the cavity walls. The partitions in the annular cavity form a plurality of circumferential spaced volume varying chambers which cyclically vary in volume with rotor rotation. The partitions are displaced in their slots by a rotor cam means outside the annular cavity with undulations allowing the continued extension of the partitions to the rotor undulant surface in the annular cavity without abutting it. The power out loss due to the allowed mass flow between neighboring volume varying chambers is sustained rather then the large losses that occur if volume varying chambers where closed to one another in the annular cavity and the wear of the parts in the annular cavity. The engine has intake means, exhaust means, and fuel injection means arranged at the annular cavity allowing the volume varying chambers to function in a four cycle or two cycle mechanical power generation process. Ignition means if used in the engine, are used only once per operation to initiate combustion in the annular cavity, thereafter the combustion process in the annular cavity is self perpetuating.

13 Claims, 60 Drawing Figures

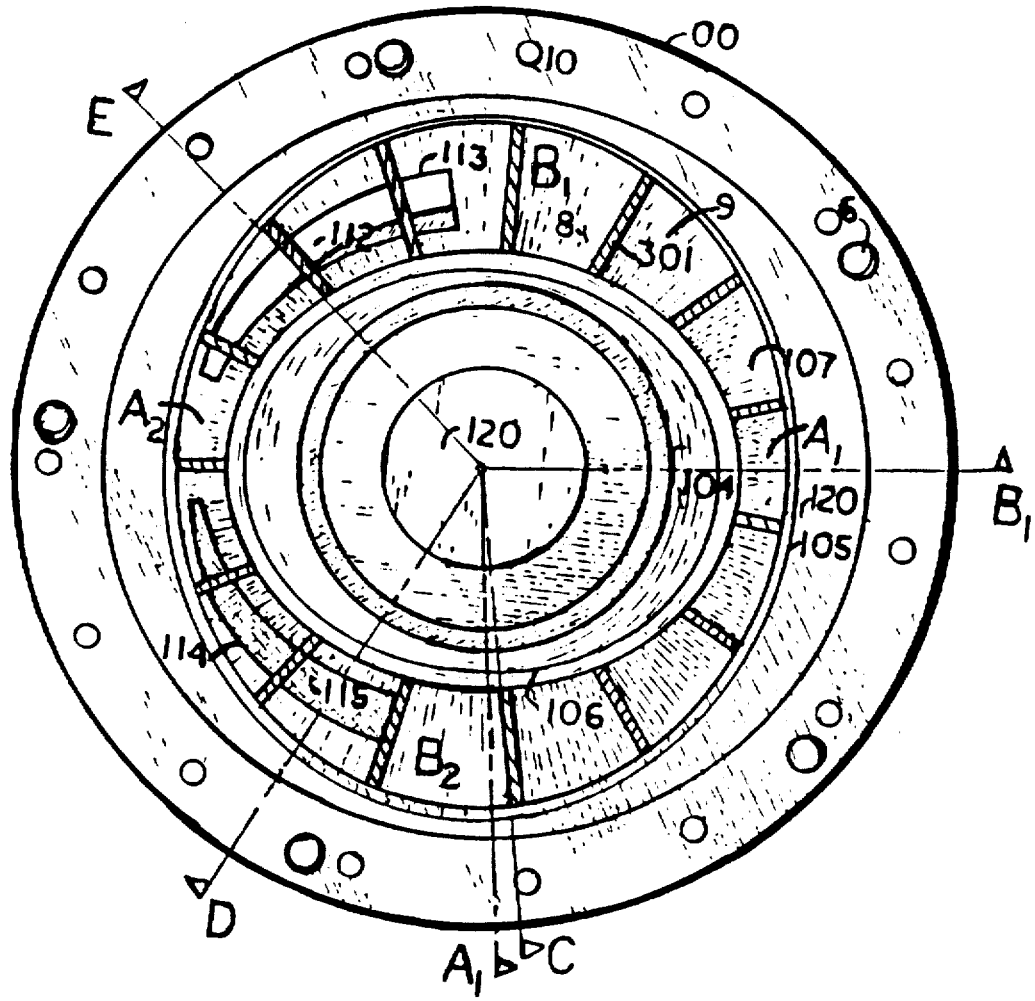

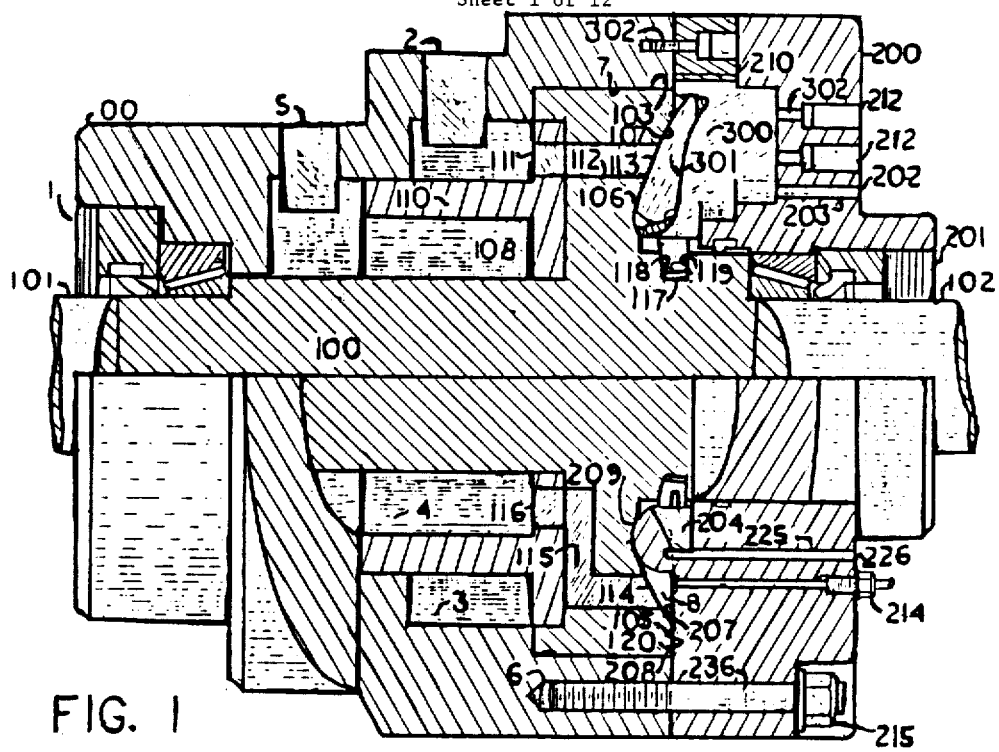
FIG. 1
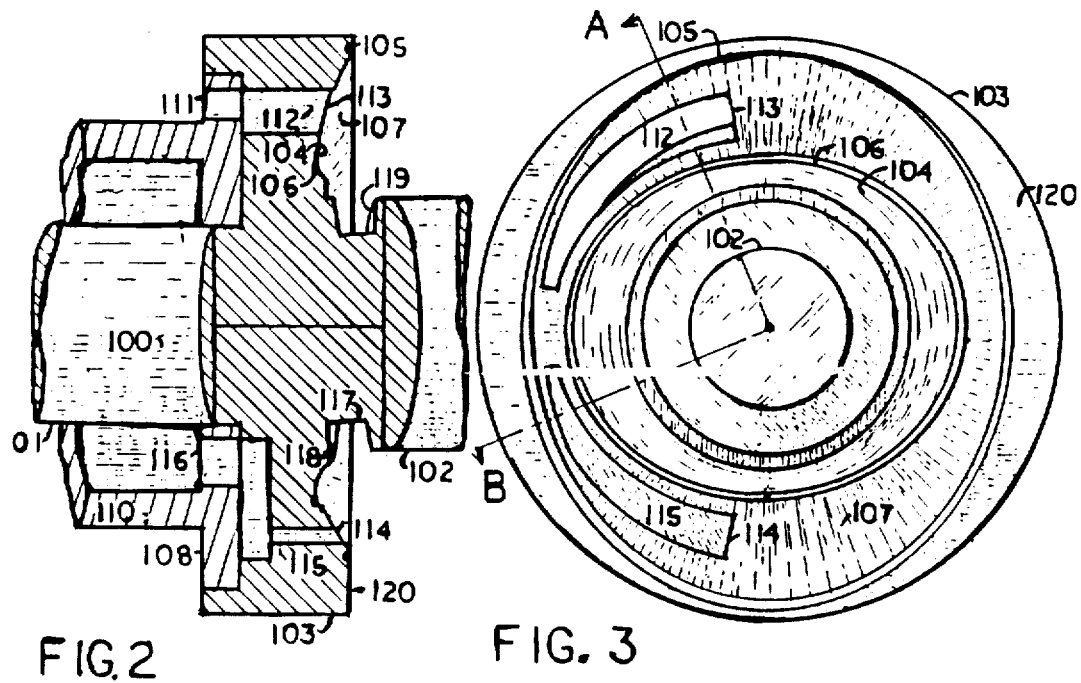
FIG. 2
FIG. 3

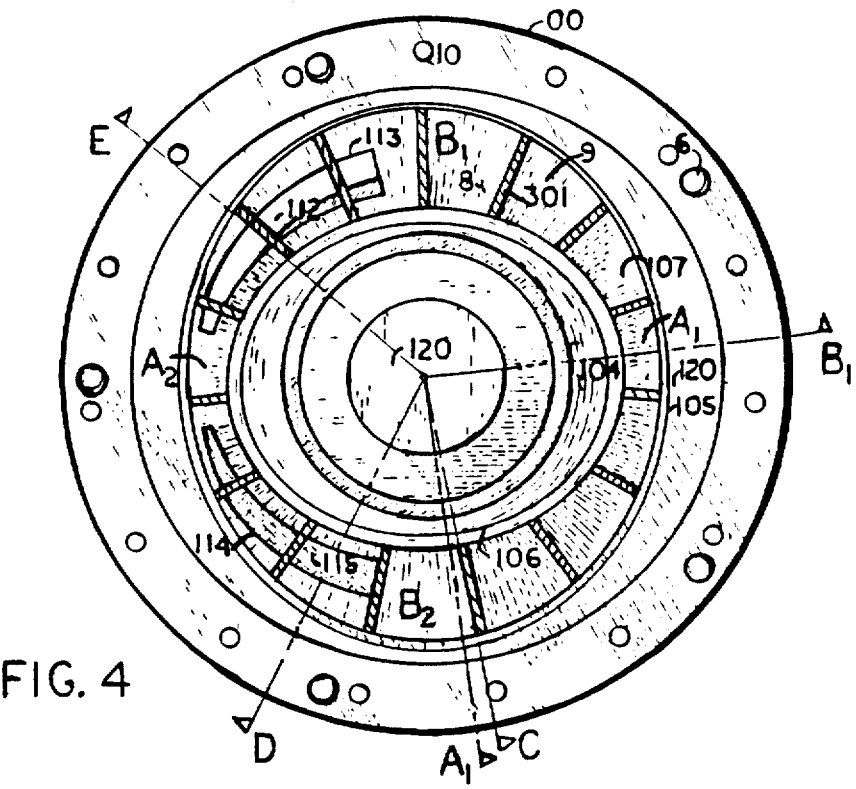
FIG. 4
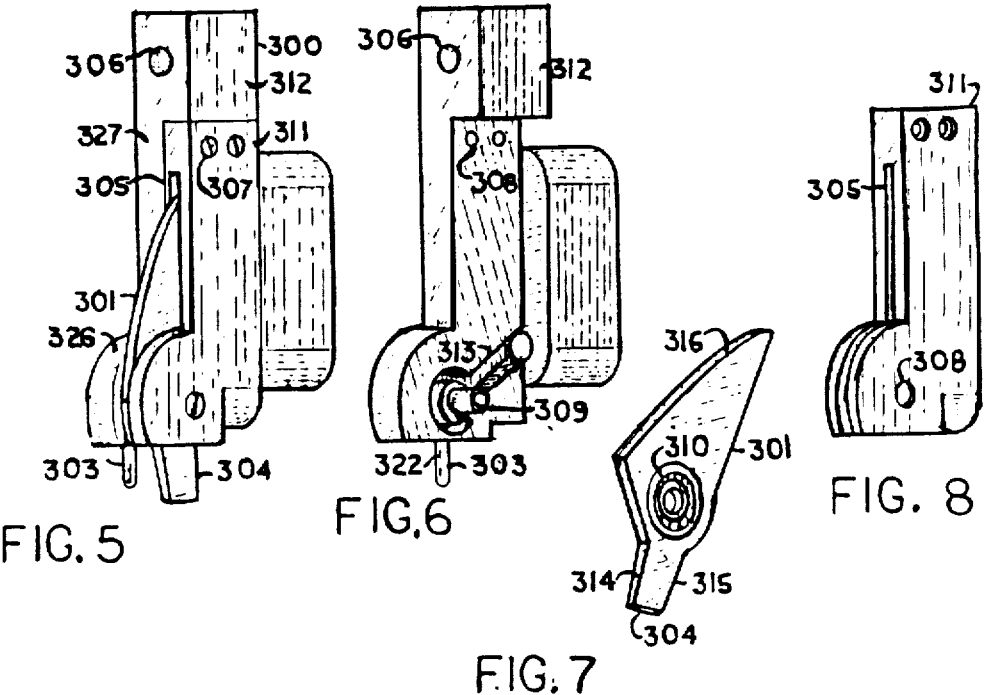
FIG. 5
FIG. 6
FIG. 7
FIG. 8

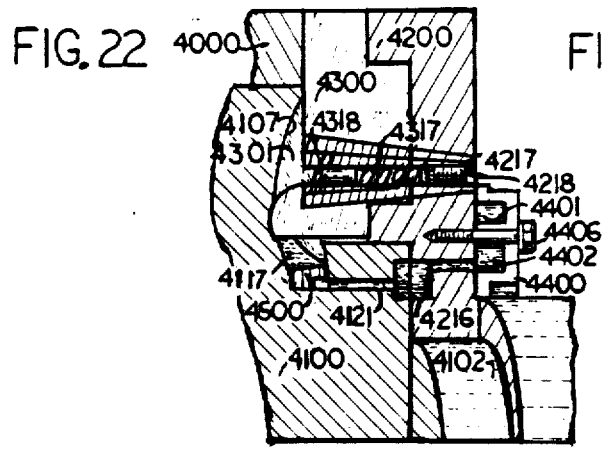
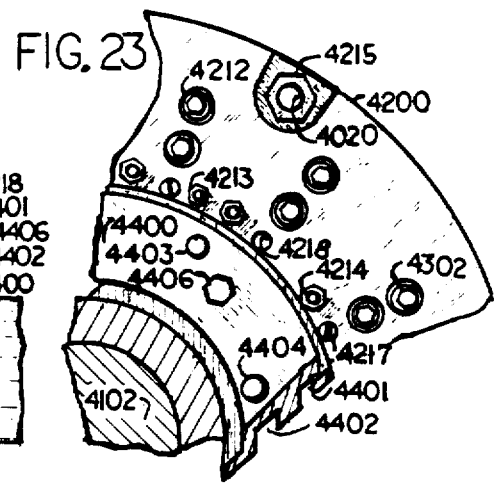
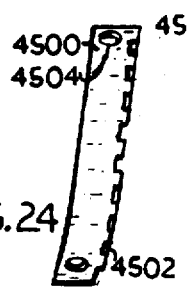
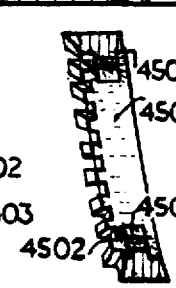
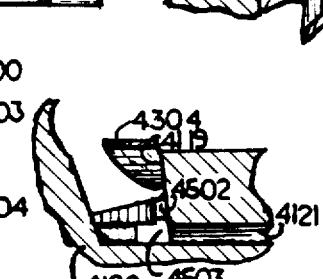
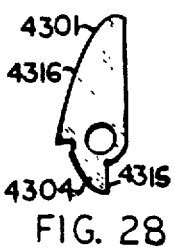
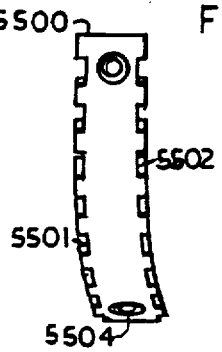
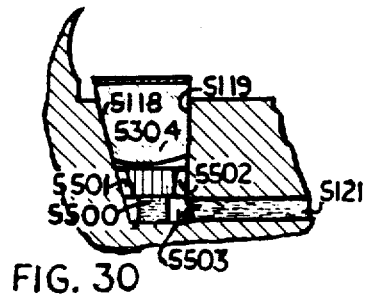
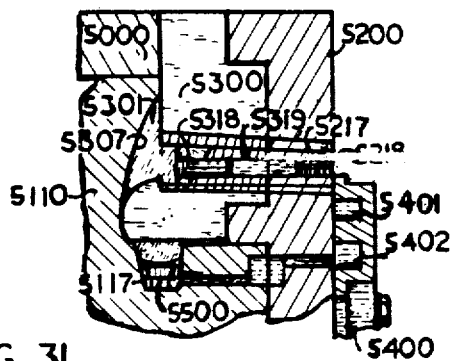

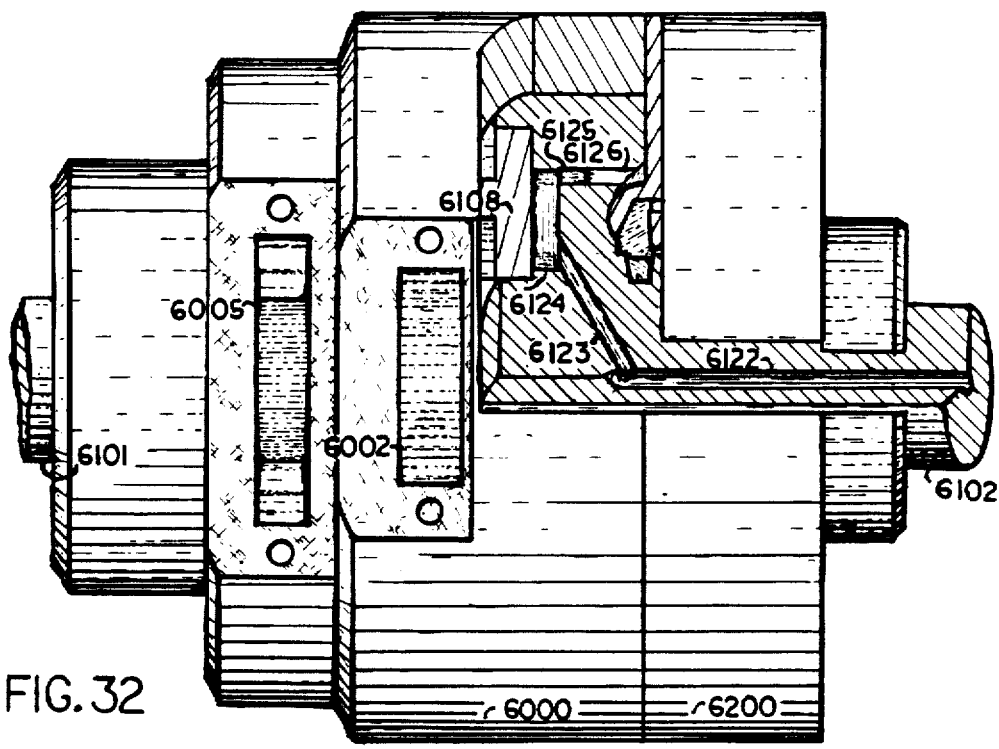
FIG. 32
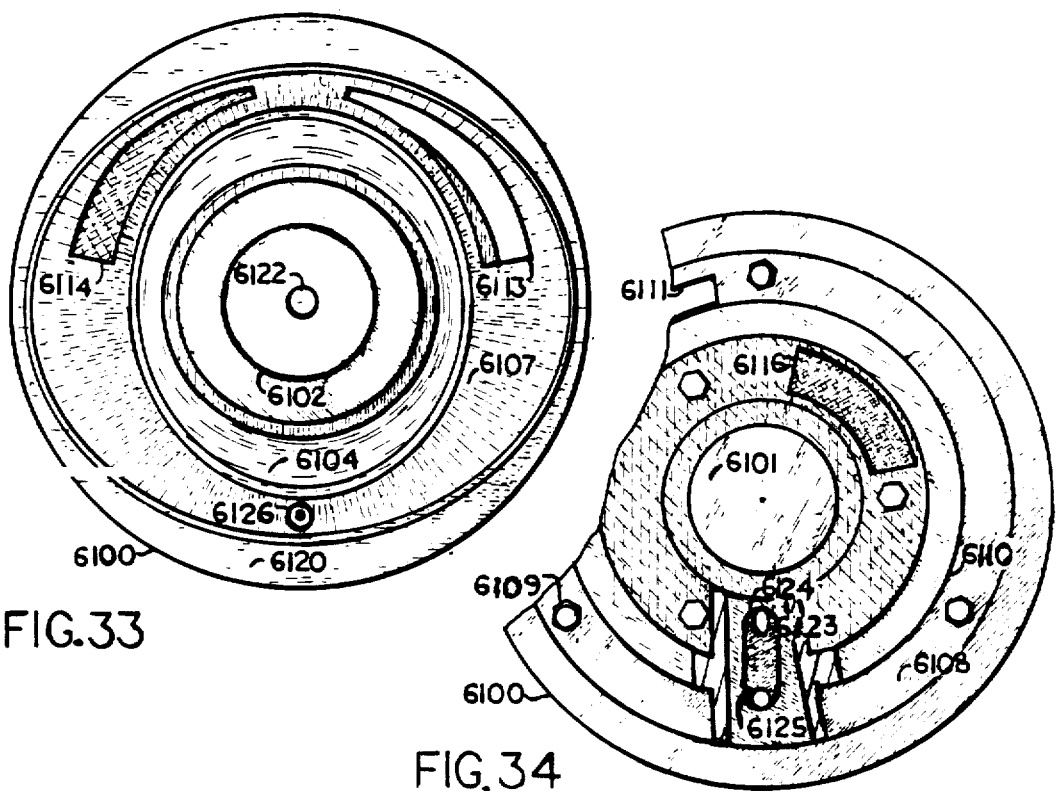
FIG. 33
FIG. 34

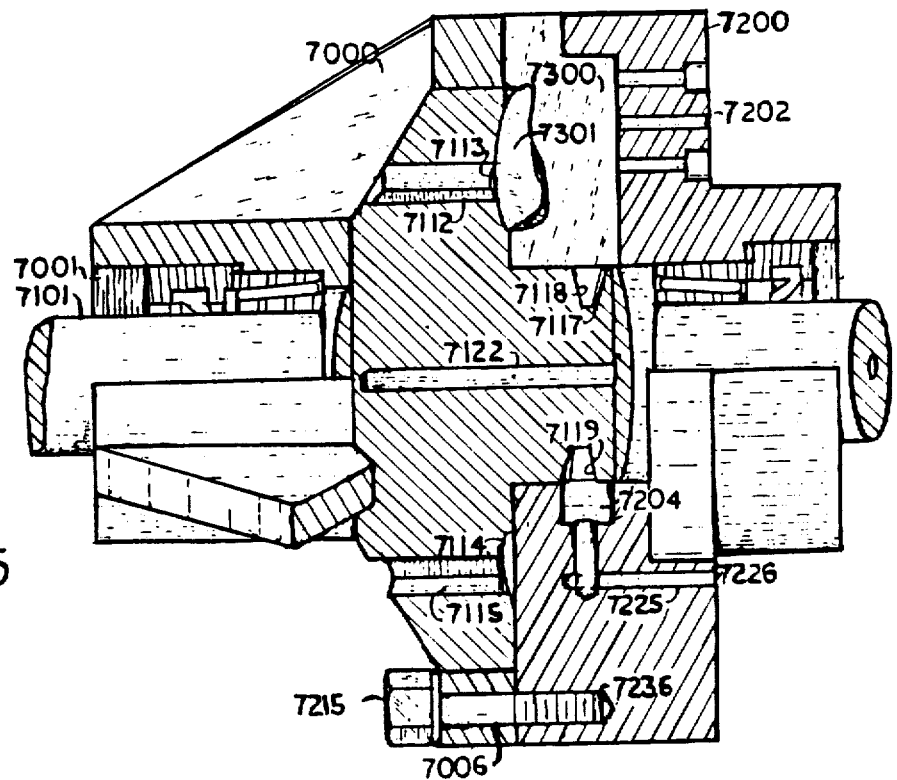
FIG. 35
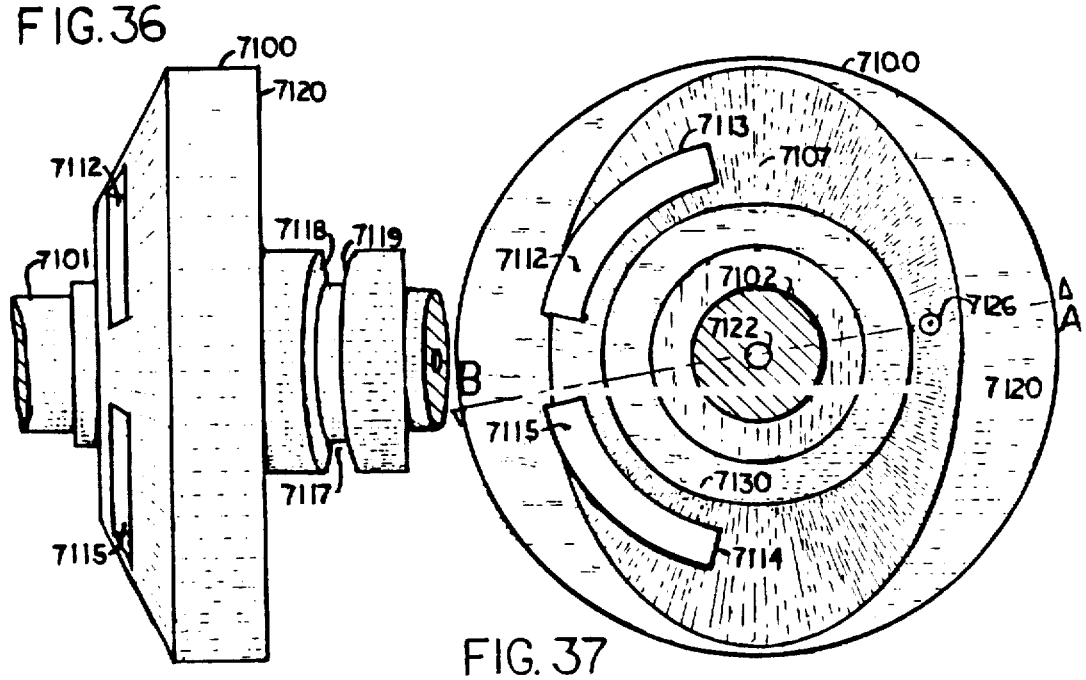
FIG. 36
FIG. 37

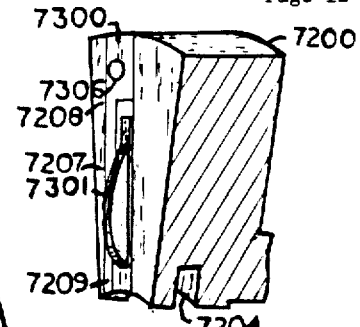
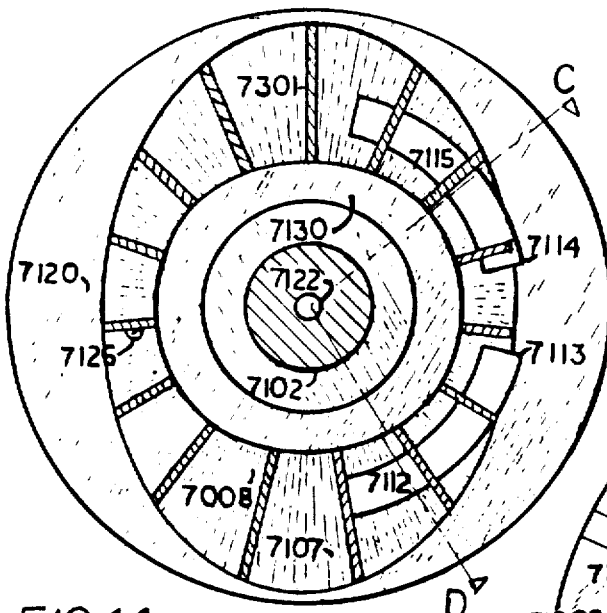
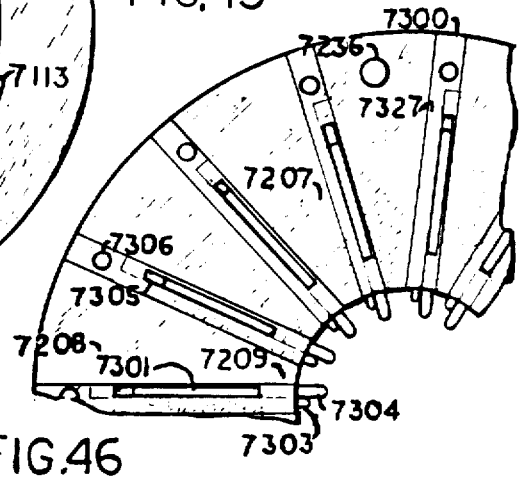
FIG.44
FIG.45
FIG.46
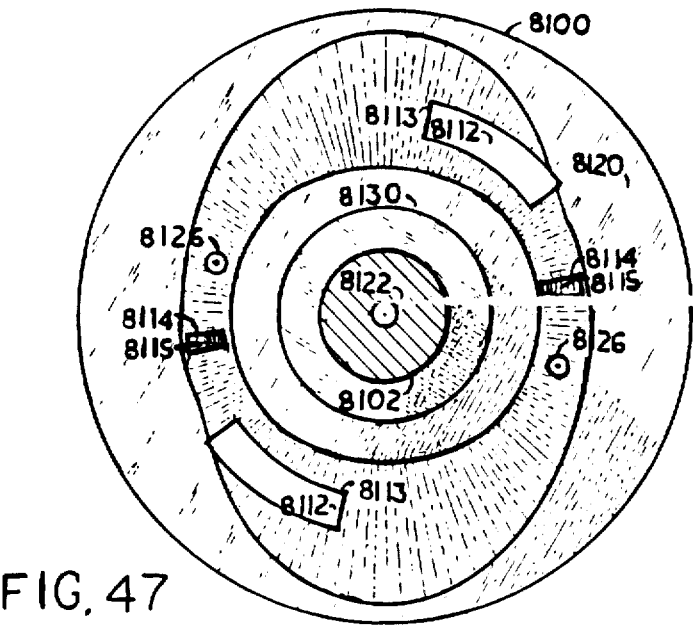
FIG.47